United States Patent
Mullet et al.

(10) Patent No.: US 7,382,063 B2
(45) Date of Patent: Jun. 3, 2008

(54) UNINTERRUPTIBLE POWER SOURCE FOR A BARRIER OPERATOR AND RELATED METHODS

(75) Inventors: Willis J. Mullet, Gulf Breeze, FL (US); Yan Rodriguez, Suwannee, GA (US); Paul J. VanDrunen, Navarre, FL (US); Richard Bardin, Milton, FL (US); Ben L. Garcia, Conyers, GA (US)

(73) Assignee: Wayne-Dalton Corp., Mt. Hope, OH (US)

( * ) Notice: Subject to any disclaimer, the term of this patent is extended or adjusted under 35 U.S.C. 154(b) by 277 days.

(21) Appl. No.: 11/136,790

(22) Filed: May 24, 2005

(65) Prior Publication Data

US 2006/0267409 A1    Nov. 30, 2006

(51) Int. Cl.
*H02J 9/00*      (2006.01)
*E05F 11/00*     (2006.01)

(52) U.S. Cl. .......................................... 307/64; 49/199
(58) Field of Classification Search ................. 307/64, 307/66; 49/199
See application file for complete search history.

(56) References Cited

U.S. PATENT DOCUMENTS

| | | | | |
|---|---|---|---|---|
| 3,746,878 | A | 7/1973 | Viger, Jr. | 307/66 |
| 4,064,404 | A | 12/1977 | Willmott et al. | 307/141.4 |
| 4,338,553 | A | 7/1982 | Scott, Jr. | 318/266 |
| 4,709,318 | A | 11/1987 | Gephart et al. | 363/37 |
| 4,716,301 | A | 12/1987 | Willmott et al. | 307/115 |
| 5,282,337 | A | 2/1994 | Duhame et al. | 49/199 |
| 5,596,840 | A | 1/1997 | Teich | 49/26 |
| 5,710,507 | A * | 1/1998 | Rosenbluth et al. | 307/66 |
| 5,844,328 | A | 12/1998 | Furst | 307/66 |
| 5,929,580 | A | 7/1999 | Mullet et al. | 318/466 |
| 5,969,637 | A | 10/1999 | Doppelt et al. | 340/825.69 |
| 6,025,785 | A | 2/2000 | Farris et al. | 340/825.31 |
| 6,051,947 | A | 4/2000 | Lhotak et al. | 318/445 |
| 6,070,361 | A | 6/2000 | Paterno | 49/14 |
| 6,079,157 | A | 6/2000 | Hincher | 49/57 |
| 6,111,374 | A | 8/2000 | Fitzgibbon et al. | 318/282 |

(Continued)

OTHER PUBLICATIONS

"Boom for Back-ups" article published in Door & Access Systems/ Spring 2005 pp. 49-50.

(Continued)

*Primary Examiner*—Michael Sherry
*Assistant Examiner*—Michael Rutland Wallis
(74) *Attorney, Agent, or Firm*—Renner Kenner Greive Bobak Taylor & Weber

(57) ABSTRACT

An uninterruptible power source (UPS) for supplying power to a barrier operator when mains power has failed is disclosed. The UPS includes a UPS controller for detecting and responding to a mains power failure and capable of generating a plurality of control signals. A backup power source and an up-converter is connected to the UPS controller, wherein the up-converter increases the voltage of the backup power source when needed. A switch is responsive to one of the plurality of control signals of the UPS controller and toggles the operator barrier between the up-converter and the mains power source, and awakens the operator via a standby receiver power line. Another embodiment awakens the operator anytime a UPS receiver receives a preamble of a wireless transmission signal. Auxiliary lighting may also be associated with the UPS and/or photo-electric safety devices.

23 Claims, 17 Drawing Sheets

U.S. PATENT DOCUMENTS

| | | | |
|---|---|---|---|
| 6,133,703 A | 10/2000 | Fitzgibbon et al. | 318/445 |
| 6,172,475 B1 * | 1/2001 | Fitzgibbon et al. | 318/266 |
| 6,209,219 B1 | 4/2001 | Wakefield et al. | 33/761 |
| 6,346,889 B1 | 2/2002 | Moss | 340/686.1 |
| 6,400,112 B1 | 6/2002 | Fitzgibbon et al. | 318/445 |
| 6,414,454 B1 | 7/2002 | Lhotak et al. | 318/266 |
| 6,414,587 B1 | 7/2002 | Fitzgibbon | 340/5.22 |
| 6,670,725 B2 | 12/2003 | Fitzgibbon et al. | 307/66 |
| 6,879,132 B2 * | 4/2005 | Oki et al. | 320/128 |
| 7,166,930 B2 * | 1/2007 | Young | 307/64 |
| 7,228,883 B1 * | 6/2007 | Murray | 160/201 |
| 2002/0051368 A1 | 5/2002 | Ulinski et al. | 363/1 |
| 2003/0076235 A1 | 4/2003 | Tsui | 340/686.1 |
| 2003/0090157 A1 | 5/2003 | Fitzgibbon et al. | 307/64 |
| 2004/0012266 A1 * | 1/2004 | Yu | 307/66 |

OTHER PUBLICATIONS

"Serious Back-up: Unique Ideas From Marantec" article published in Door & Access Systems/Spring 2005 p. 23.

* cited by examiner

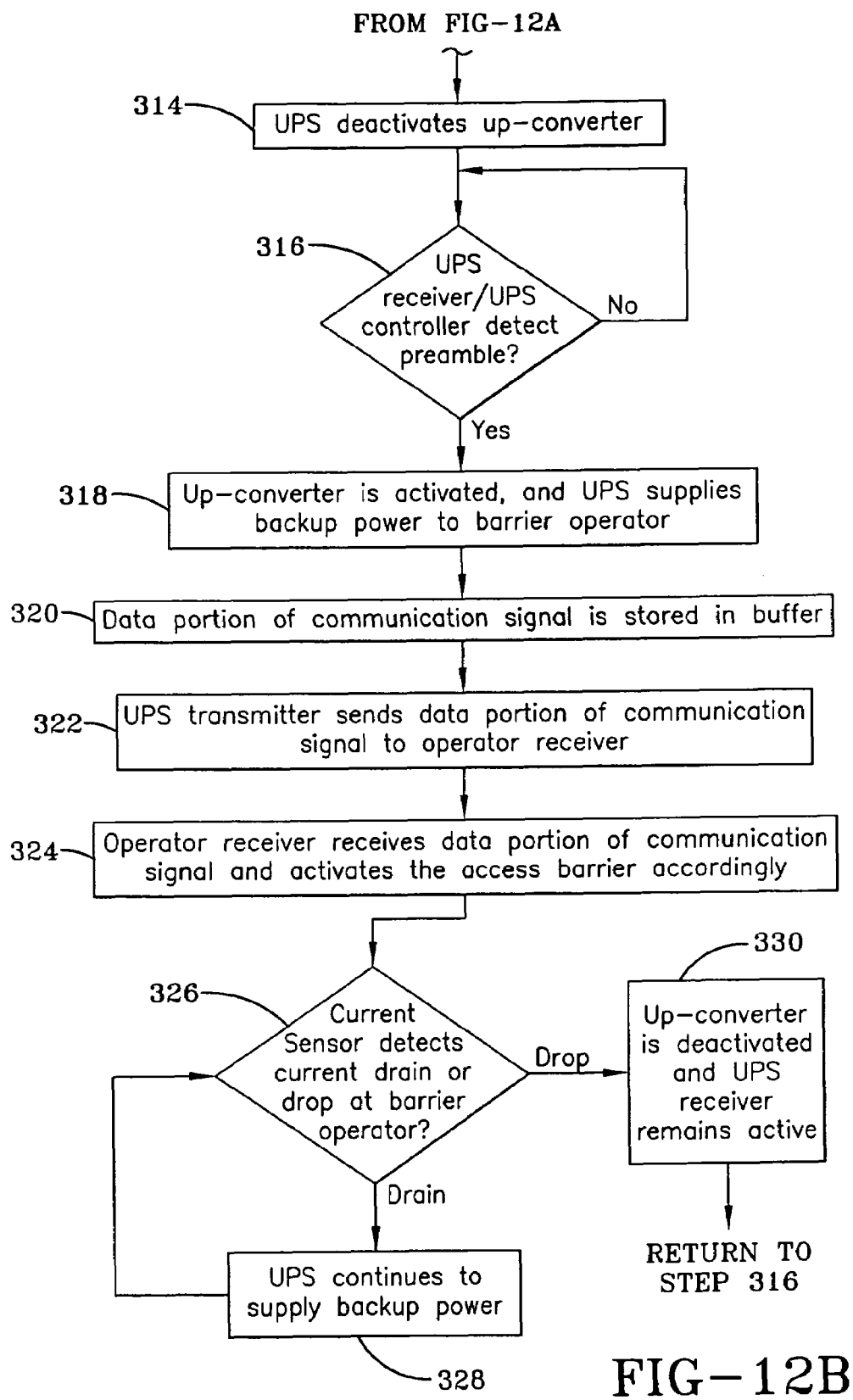

UNINTERRUPTIBLE POWER SOURCE FOR A BARRIER OPERATOR AND RELATED METHODS

TECHNICAL FIELD

Generally, the present invention relates to an uninterruptible power source system for supplying backup power to an access barrier when mains power has failed. More specifically, the present invention is directed to an uninterruptible power source that can be coupled to a separately installed barrier operator. More particularly, the present invention is directed to an uninterruptible power source that in response to a transmitted request responsively provides backup power to operate the barrier operator.

BACKGROUND ART

Uninterruptible power supplies are used to provide backup electrical power to equipment in instances where standard commercial power, or mains power is out of service. Typical uninterruptible power supplies comprise an energy storage unit, such as a battery, to supply backup power to equipment when needed. The stored energy capacity of the battery is maintained by a charging circuit, which charges the battery using mains power. An uninterruptible power supply (UPS) may also include circuitry that is capable of transforming the battery's stored power into a form that is compatible with the equipment receiving the backup power. For example, if an AC powered electric motor requires backup power from the UPS, then the battery's DC power must be converted to an AC form to operate the AC motor. To ensure that power is supplied to the equipment when mains power fails, a switching system within the UPS is provided which disconnects the out-of-service mains power, and connects the battery to the equipment to be operated. This action is reversed when mains power returns to service.

While a UPS may be used for various applications, there are special considerations when a UPS is used in conjunction with a barrier operator that moves an access barrier, such as a garage door, between open and closed positions. Thus, when the barrier operator requires AC power to operate its electric motor, the uninterruptible power source must convert the DC power of the uninterruptible power source's backup battery into AC power, such as 120 VAC at 60 Hz, through the use of a power converter or invertor that includes semiconductor transistor circuitry (i.e. switches). When the converter or invertor is enabled, due to a mains power failure, an oscillator, operating at a predetermined frequency, drives the semiconductor transistors that produce current pulses at the output of the transformer, thereby simulating AC power. As a result, the stored DC energy of the backup battery is continuously converted into AC power until mains power is restored, or the energy storage capacity of the battery is fully depleted. The operation of the oscillator and semiconductor transistors generally have an efficiency of about 50%, and as a result, they consume significant power from the backup battery. This conversion may take place continuously, quickly consuming the stored energy of the backup power source. Thus, there is a need for an uninterruptible power source that can provide backup power to a barrier operator only when it is needed on demand.

Further, users of barrier operators traditionally purchase the barrier operator without considering the additional benefit that an uninterruptible power source may provide. Thus, if the user later desires to add the uninterruptible power source to an already installed barrier operator, he or she may be required to purchase a new barrier operator which has an integrated uninterruptible power source. As a result, the user must needlessly discard a functional barrier operator, while expending additional money and time to purchase and install an entirely new barrier operator that includes the UPS function. Thus, there is a need for an uninterruptible power source that a user can easily attach to an existing barrier operator, in a user-friendly manner.

Additionally, users of barrier operators having a UPS system may reside in geographic regions where temperatures are cold, or where temperatures fluctuate between warm and cold. Under these conditions, the UPS battery may resist being re-charged by the battery charger. As a result, the battery's performance is reduced, thus limiting the time that the barrier operator can be utilized during a mains power failure. Additionally, cold temperatures tend to reduce the useful operating life of the batteries, thus increasing battery replacement frequency and overall cost of ownership. Therefore, there is also a need for a UPS battery heating device, that can maintain the battery's optimal operating temperature while subjected to less than optimum operating temperatures.

Furthermore, uninterruptible power sources currently provided for use with barrier operators do not provide a system for monitoring the status of the battery. As a result, the battery may be in need of replacement, while not having the capacity to operate the barrier operator when the mains power has failed. This is especially problematic if the user solely relies on a garage door as the sole means for entering one's home. In such a case, the user may have to forcibly enter their home, thus incurring the inconvenience and expense needed to make the repairs thereto. Thus, there is a need for a UPS battery monitor that can provide the user with the battery's status or condition, allowing him or her to replace the battery prior to a mains power failure.

Many times when mains power fails, the ambient light outdoors is insufficient to allow safe ingress and egress through the area where the barrier operator and corresponding access barrier are mounted. Because of this, the risk for injury is greatly increased. As a result, there is a need for auxiliary lighting that illuminates a desired area, when mains power has failed, so as to allow safe ingress and egress through the region controlled by the access barrier.

DISCLOSURE OF INVENTION

It is thus a first aspect of the present invention to provide an uninterruptible power source for a barrier operator and related methods.

Another aspect of the present invention is to provide an uninterruptible power source (UPS) for supplying power to a barrier operator when mains power has failed, the uninterruptible power source comprising: a UPS controller for detecting a mains power failure, the UPS controller responsive a mains power failure and capable of generating a plurality of control signals; a backup power source connected to the UPS controller; an up-converter connected to the UPS controller and to the backup power source, the up-converter increasing the voltage of the backup power source and responsive to the signals sent by the UPS controller; a standby receiver power line connected to the UPS controller and connectable to the barrier operator; a switch connected to the UPS controller, the up-converter, and the mains power source, the switch being responsive to one of the plurality of control signals of the UPS controller;

and an operator power line connected to the switch and connectable to the barrier operator, wherein the switch, in response to a signal from the UPS controller, toggles the operator barrier between the up-converter and the mains power source, and awakens the operator via the standby receiver power line.

Still another aspect of the present invention is attained by an access barrier movement apparatus for moving an access barrier when mains power has failed, the apparatus comprising: a barrier operator having an operator receiver responsive to communication signals and an operator power converter for converting mains power to DC power; an uninterruptible power source connected to the barrier operator and comprising: a UPS controller responsive to failure of the mains power, the UPS controller sending and receiving a plurality of signals to control the operation of the access barrier operator; a backup power source connected to the UPS controller, the UPS controller providing the operator receiver with continuous operating power; an up-converter connected to the UPS controller and the backup power source, the up-converter increasing the voltage of the backup power source in response to signals from the UPS controller; a switch connected to the UPS controller, the switch controlled by the UPS controller, wherein the switch toggles the barrier operator between the mains power source and the up-converter in response to the UPS controller.

Yet another aspect of the present invention is attained by an access barrier movement apparatus for moving an access barrier when mains power has failed, the apparatus comprising a barrier operator having an operator receiver responsive to a data portion within a communication signal and an operator power converter for converting mains power to DC power; an uninterruptible power source connected to the barrier operator and comprising a UPS controller responsive to failure of the mains power, the UPS controller sending and receiving a plurality of signals to control the operation of the access barrier operator; a UPS receiver connected to the UPS controller, the UPS receiver responsive to a preamble portion within the communication signal; a backup power source connected to the UPS controller and the UPS receiver; an up-converter connected to the UPS controller and the backup power source, the up-converter increasing the voltage of the backup power source in response to signals from the UPS controller; and a switch connected to and controlled by the UPS controller, wherein the switch toggles the barrier operator between the mains power source and the up-converter in response to the UPS controller, and wherein the UPS receiver is switched on by the UPS controller after the back-up power source reaches a predetermined threshold.

Still yet another aspect of the present invention is attained by a barrier operator system with safety lighting, comprising an operator controller and associated linkage which moves a barrier between limit positions; a photo-electric sensor operatively connected to the operator controller, the photo-electric sensor having a sending unit which projects a light beam to a receiving unit, wherein interruption of the light beam during door movement is communicated to the operator controller; a light associated with at least one of the sending unit and the receiving unit.

BRIEF DESCRIPTION OF THE DRAWINGS

For a complete understanding of the objects, techniques and structure of the invention, reference should be made to the following detailed description and accompanying drawings, wherein:

FIGS. 12A-B show an operational flowchart highlighting the operation of the further alternate embodiment of the UPS when mains power fails, and the UPS is activated.

BEST MODE FOR CARRYING OUT THE INVENTION

Figure 1:
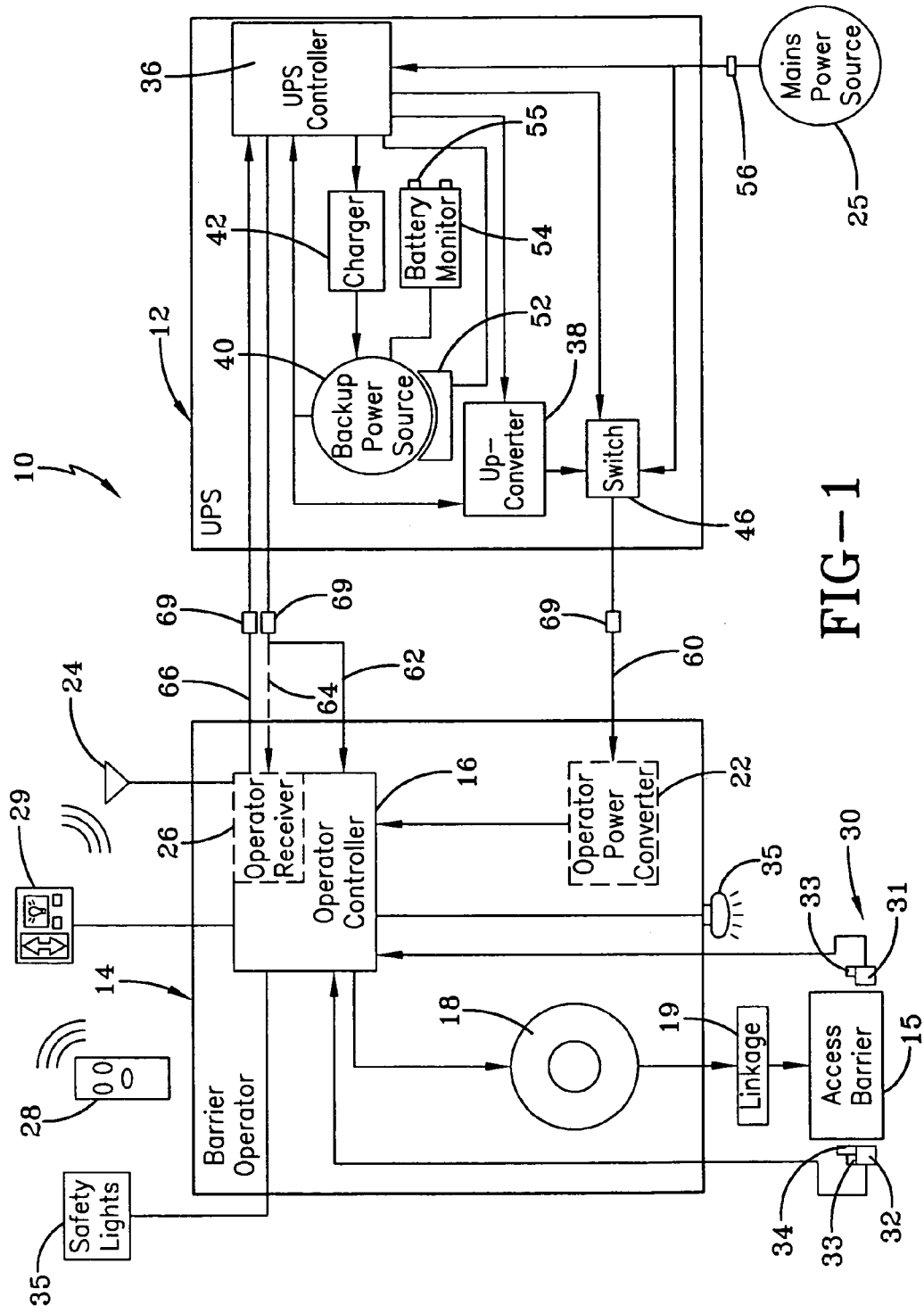
FIG. 1 is a schematic diagram of an uninterruptible power supply (UPS) and a barrier operator according to the concepts of the present invention.

A system for supplying backup power to an access barrier operator when standard commercial line power, or mains power, fails is generally indicated by the numeral 10 in FIG. 1. Standard commercial or mains power is defined as AC electrical power that is generally available on public commercial power lines, such as 120 VAC, at 60 Hz for example. While the system 10 is generally used with mains power, it is contemplated that the system 10 may be adapted for use with non-standard line power as well, using techniques readily known in the art. The system 10 includes an uninterruptible power source (UPS) 12, which is coupled to a barrier operator 14. Generally, in the event that mains power fails, the UPS 12 supplies backup power to the barrier operator 14 to enable movement of an access barrier 15 associated therewith. Although the system 10 is configured for use with a garage door, other movable barriers such as curtains, gates, awnings, and windows could also be associated therewith. The system 10 may be configured such that a use's request to actuate the access barrier 15 is received and authenticated by the barrier operator 14. Once authenticated, the barrier operator 14 moves the access barrier 15 between open and closed positions according to the user's request. The UPS 12 can be embodied as a standalone module that can be added-on to a previously installed barrier operator 14, that is designed to be compatible with the UPS 12, or the UPS 12 may be integrated directly into the design of the barrier operator 14.

The barrier operator 14 includes an operator controller 16 which receives input signals and generates output signals to control the various functions of the components associated with the system 10. The operator controller 16 is a logic control that may be implemented using a general purpose, or application specific semiconductor based microprocessor/micro-controller that provides the necessary hardware, software, and memory to carry out the desired functions. The operator controller 16 receives the power via the UPS 12 and supplies it to the motor 18. The motor 18 is connected to the access barrier 15 by linkage 19. The linkage 19 may be a counter-balancing system used to assist in moving the barrier between open and closed positions. The linkage 19 may be part of a header-mounted, trolley type, screw drive, jackshaft or any other mechanism used to assist in moving the barrier. To assist in the movement of the barrier 15, the operator controller 16 controls various aspects of the motor's operation including but not limited to speed, torque, and motor rotation direction.

In one embodiment, the motor 18 operates on DC power, and it should also be appreciated that the operator controller 16 could use pulse width modulation (PWM) as a technique to control the motor's operation. In an alternative embodiment, the motor 18 operates on AC power and could be adapted for any frequency of operation.

It is also contemplated that in one embodiment, the barrier operator 14 includes an operator power converter 22 that is connected to the operator controller 16. In this embodiment, a DC motor 18 is used, and as such, it is required that the converter 22 process an AC mains power 25 or the AC output of the UPS 12 into DC power that is compatible with the operation of the motor 18. The power converter 22 may comprise a power rectifier, or any other suitable device that converts AC power to DC power.

In an alternative embodiment, where the motor 18 with the barrier operator 14 is powered by alternating current, the power converter 22 is not needed, and the AC mains power 25 or the AC output of the UPS 12 is directly coupled to the operator controller 16.

In order for a user to remotely operate the access barrier operator 14, an operator antenna 24 is connected to an operator receiver 26 that is connected to the operator controller 16. It will be appreciated that the operator receiver 26 may either be directly integrated into the circuitry of the operator controller 16, or the operator receiver 26 may be a separate functional component that is powered independently from the operator controller 16, as indicated by the dashed lines of FIG. 1. The antenna 24 and operator receiver 26 are responsive to the receipt of wireless communication signals transmitted from a remote transmitter 28. The transmitted communication signals contain function data, authentication data, and any other desired data. The function data corresponds to various functions that a user may invoke in the barrier operator 14. These functions include, but are not limited to, the opening or closing of the access barrier, delayed operation of the access barrier, and timed operation of the access barrier. Methods of encoding data onto a transmitted carrier frequency may be utilized between the transmitter 28 and the operator receiver 26. The wireless communication signals transmitted by the transmitter 28 and received by the operator receiver 26 may be implemented using the entire spectrum of communication frequencies and any suitable communication protocol, including but not limited to: radio frequency (RF) waves, microwaves, light waves such as infrared, and sonic waves.

To ensure that only transmission signals for use with a predetermined receiver/transmitter pair 26,28 actuate the selected barrier operator 14, a secure encryption code system may be implemented. The encryption system requires that the operator receiver 26 and transmitter 28 are "paired" together using an encrypted authentication code contained within the communication signal sent by the transmitter 28 which is unique and common only to a transmitter 28 and operator receiver 26 that have been previously learned or paired together. The system 10 may use most any authentication system, but an exemplary signal authentication system is provided by KEELOQ®.

The operator controller 16 may also receive command signals directly from a wall station transmitter 29, which is hardwired to the operator controller 16. The command signals may comprise any function provided by the barrier operator 14, such as those functions discussed previously with respect to the transmitter 28. The wall station 29 may also be a wireless type transmitter that operates in the same manner as the remote transmitter. It will also be appreciated that different types of transmitters such as keyless entry or hands-free may be learned and operative with the operator controller 16.

Figure 2B:
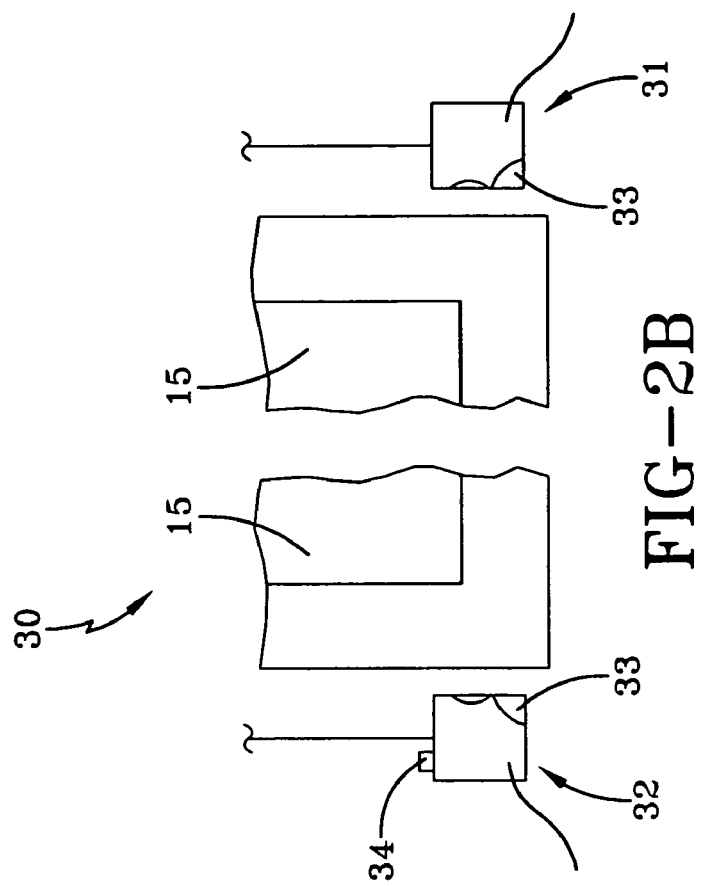
FIG. 2B is an enlarged schematic view of the photoelectric sensor with integrated auxiliary lights.
Figure 2A:
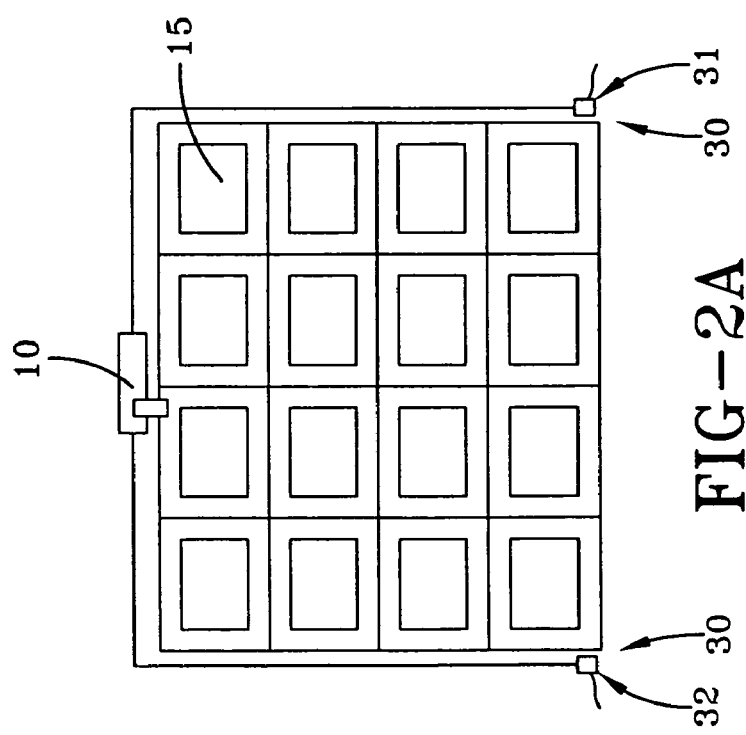
FIG. 2A is an elevational view of a mounted barrier operator and UPS with attached access barrier, and photoelectric sensor with integrated auxiliary lights.
Figure 3:
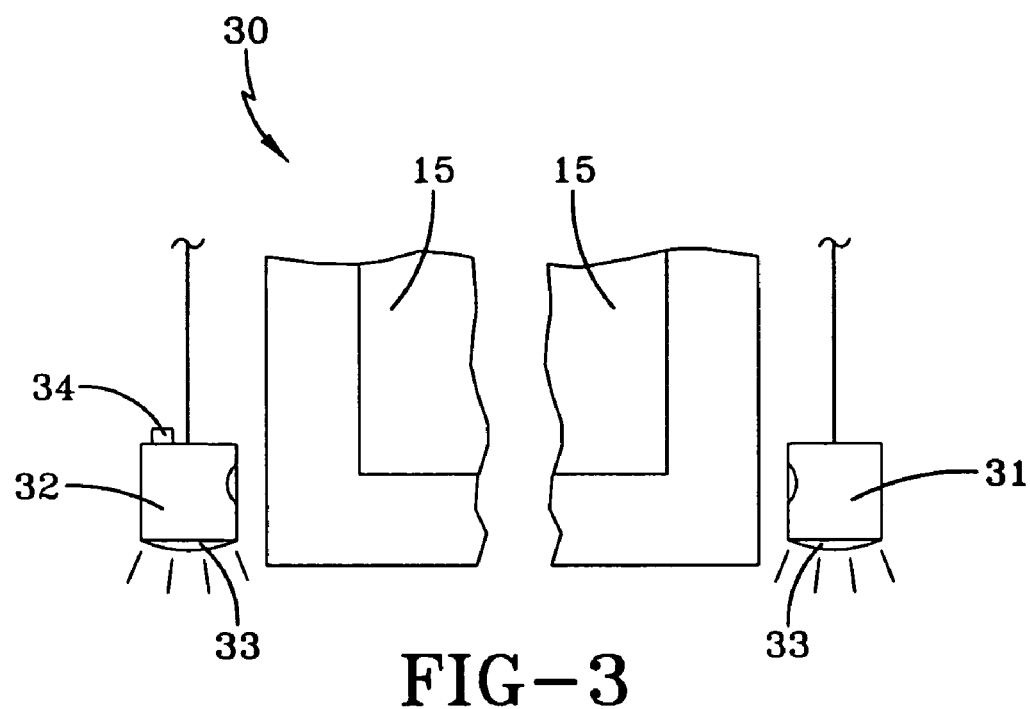
FIG. 3 is an enlarged schematic view of an alternate embodiment of the photoelectric sensor with integrated auxiliary lights.
Figure 4:
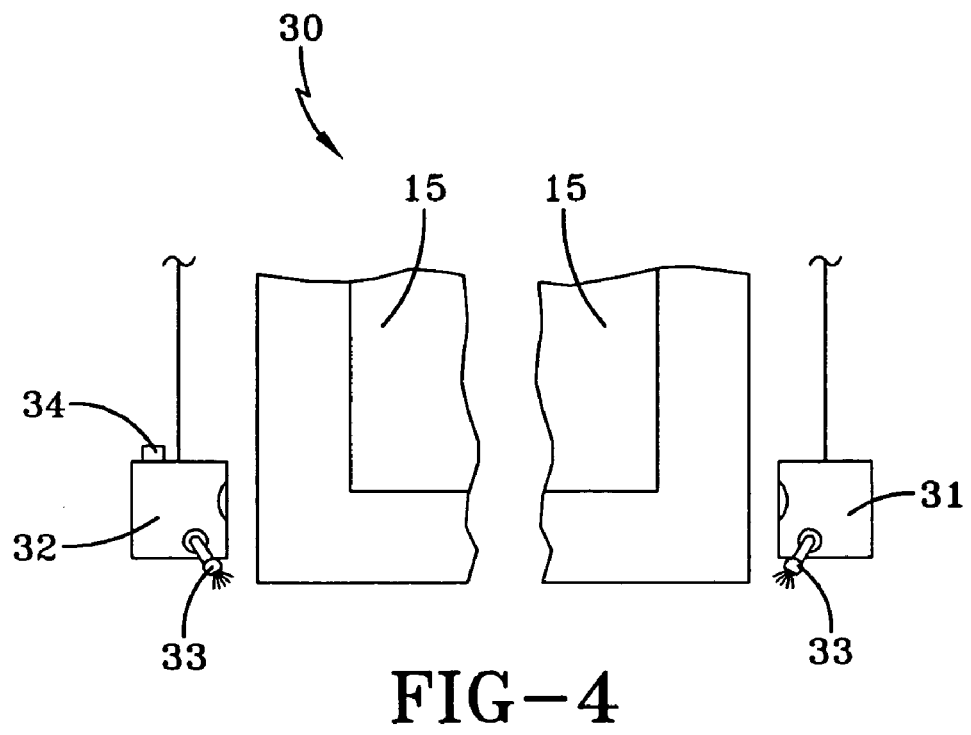
FIG. 4 is an enlarged schematic view of another embodiment of the photoelectric sensor with integrated auxiliary lights.

An optional photoelectric sensor, generally designated by the numeral 30, is also connected to the operator controller 16. The sensor 30, shown more clearly in FIGS. 2A and FIG. 2B, includes a sending unit 31 that generates a light beam received by an aligned receiving unit 32. The light beam is in close proximity to the path of the barrier 15, and if an obstruction blocks the light beam during at least the closing movement of the door, the operator controller 16 initiates necessary action to stop and/or reverse the movement of the access barrier 15. One or more auxiliary lights 33, as shown in FIG. 2B provide a source of backup lighting during a mains power outage, and may be connected to one or both of the units 31 and 32. The auxiliary lights 33, during a mains power outage may be actuated in response to a user's request via the transmitter 28 or wall station transmitter 29. Additionally, the auxiliary lights 33 may be actuated according to any other desired function when mains power is available or not. For example, during a failure of the mains power 25, the auxiliary lights 33 may only be operational during the time that the barrier operator 14 is moving the access barrier 15. Or the auxiliary lights 33 may be turned "on" by a function initiated by the transmitter 28/wall station transmitter 29 and/or operator controller 16. The photoelectric sensor 30 may also contain an ambient light detection sensor 34, such as a photoelectric cell, for detecting the presence of a low ambient light condition and transmitting this condition to the operator controller 16. Thus, the light sensor 34 would limit the auxiliary light's 33 operation to only those times when ambient light is insufficient, and additional light is needed. In other words, if the mains power 25 is not available and the ambient light sensor 34 detects minimal light, the operator controller 16 would signal illumination of the lights 33. In the alternative, the light sensor 34 upon the detection of low ambient light may directly illuminate the auxiliary light 33. As a result of this operation, the backup power of the UPS 12 is further conserved. The auxiliary lights 33 may be any type of light source, including but not limited to incandescent, fluorescent, and light emitting diodes (LED) any of which can be in the form of a flood light or a spot light. It is also contemplated that the auxiliary lights 33 may be of the low-voltage type, which operate on AC or DC power. Further, the auxiliary lights 33 may be pre-configured to be fixed in any predetermined orientation. For example, the lights 33 shown in FIGS. 2B are directed inward toward the area of ingress and egress of the access barrier 15, whereas FIG. 3 illustrates the auxiliary lights 33 when directed downward toward the floor. Alternatively, the auxiliary lights 33 may also be adjustably mounted, allowing the user to adjust the lights 33 where it is needed. For example, a ball and socket type light 33, as shown in FIG. 4, may be used to allow the user to adjustably swivel the auxiliary light 33 to illuminate an area in a desired manner.

Turning back to FIG. 1, a standalone or safety light 35 may also be connected to the operator controller 16. The safety light 35 allows the user to install the lighting wherever light is needed, in the event of a mains power 25 failure, without being limited to the area where the photo electric sensors 30 are mounted. The operation of the safety lights 35 may follow the same sequence as that of the auxiliary lights 33 previously discussed.

The UPS 12 comprises a UPS controller 36, an up-converter 38, a backup power source 40, a charger 42, a switch 46, and a mains connector 56. Optionally provided with the UPS 12 are also a battery heater 52 and a battery monitor 54. The UPS controller 36 is provided to coordinate the operation of the UPS 12 with the operator controller 16. The UPS controller 36 is a logic control that may be implemented using a general purpose, or application specific semiconductor based microprocessor/micro-controller that provides the necessary hardware, software, and memory to carry out the functions to be described.

One component connected to the UPS controller 36 is the up-converter 38. When the up-converter 38 is activated by the UPS controller 36, the up-converter 38 increases the low-voltage DC power supplied by the backup power source 40 to a higher power AC voltage. For example, if a 12 VDC backup power source 40 is used, the up-converter 38 may increase the 12 VDC voltage to 120 VAC for delivery to the barrier operator 14. The backup power source 40 may comprise a battery or any other energy source that is capable of supplying DC power, however a battery is typically used. The battery could be of any rechargeable type that is suitable for such application, including but not limited to: lead-acid, lithium ion, nickel metal hydride, nickel cadmium, sodium/sulfur cells, nickel/sodium cells, manganese-titanium cells, rechargeable alkaline manganese cells, nickel zinc cells, iron-nickel cells, iron silver cells, redox (liquid electrode) cells, lithium-sulfur cells, and supercapacitor type cells. If needed, the battery may be user-replaceable. Such disposable type cells may include, but are not limited to Leclanche' cells, alkaline cells, mercury oxide cells, zinc/air cells, aluminum air cells, lithium cells and lithium iron cells. Use of disposable type batteries may necessitate re-configuration of the UPS.

When the backup power source 40 comprises a battery, the UPS 12 also includes a charger 42 connected between the UPS controller 36 and the backup power source 40. Thus, during the time that mains power 25 is in operation, the UPS controller 36 receives the mains power 25 and generates a battery charger control signal received by the charger 42. The backup power source 40 is then supplied with a charging current to maintain the charge of the battery at its optimal level.

Optionally connected to the UPS controller 36, and maintained in close proximity to the backup power source 40, is a battery heater 52. The heater 52, includes a temperature sensor to maintain the temperature of the battery comprising the backup power source 40 at its optimal operating temperature. Moreover, the heater 52 prevents the battery from developing a resistance to being charged, should the UPS 12 be mounted in an area that is subjected to cold or fluctuating temperatures.

In addition, an optional battery monitor 54 may also be connected to the backup power source 40 to display one or more status conditions of the UPS battery. For example, the battery monitor 54 may indicate a variety of conditions to the user, such as: an indication that the battery is being charged, an indication as to when the battery is fully charged, or an indication of when the battery is in need of replacement. It is also contemplated, that the monitor 54 could also provide an audible alert to indicate the aforementioned conditions of the battery. The UPS 12 may also incorporate one or more status lights 55, that illuminate in various patterns or sequences corresponding to a specific condition of the battery, so that a user can visually ascertain the condition and status of the battery. Although any various patterns and sequences of the status lights may be used, an exemplary status lighting system uses the following to indicate the status and condition of the battery to the user: a flashing green light to indicate that the battery is being charged; a solid green light to indicate that the battery is fully charged; a solid red light to indicate that mains power is out of service, and that the UPS 12 is functioning properly; an alternating flashing red and green light indicating that the UPS 12 has an electrical fault; a flashing red light indicating that the battery needs replacement; and un-illuminated green and red lights indicating that a fuse is blown or that the UPS battery's capacity has been exhausted from use. It will be appreciated that any other suitable light pattern or arrangement for indicating the status of the battery-type backup power source may be used in accordance with the battery monitor 54. The battery monitor 54, ensures the user is aware that the UPS battery is in need of replacement prior to the battery's failure.

The switch 46 receives as inputs the high-voltage AC power from the up-converter 38 and the AC power from the mains power source 25. When the UPS controller 36 detects a mains power 25 failure, the UPS controller 36 sends a control signal to the switch 46 which disconnects the mains power source 25 from the barrier operator 14, and correspondingly connects the un-activated up-converter 38 to the barrier operator 14. In this situation, the barrier operator 14 receives the backup power supplied by the UPS 12 if the UPS controller 36 determines that a properly authenticated transmission signal to actuate a function provided by the barrier operator 14 has been sent by one of the transmitters 28/29. When mains power 25 returns to service, a control signal sent from the UPS controller 36 to the switch 46 causes the switch 46 to disconnect the up-converter 38 from the barrier operator 14, while reconnecting the mains power 25 source to the barrier operator 14. The switch 46 may be implemented from relays, or solid-state transistors, which are suitable for switching between multiple power sources.

A mains connector 56 is provided to allow a user to connect the UPS 12 to the mains power source 25. It is contemplated that the mains connector 56 may be comprised of any standard electrical outlet plug for use with standard electrical receptacles commonly found in residential homes. However, it is also contemplated that the mains connector 56 may be any other suitable connector that allows the user to connect the UPS 12 to the mains power source 25. The mains power connector 56 may also include an electrical power cord of any appropriate length.

The UPS 12 is linked to barrier operator 14 as either an integral unit or removably attached in such a way that the UPS 12 can be connected between the mains power 25 and the barrier operator 14. An exemplary connection between the operator 14 and the UPS 12 includes an operator power line 60, a standby controller power line 62, and a standby receiver power line 64, and a UPS control line 66. These power and control lines 60-66 allow the UPS 12 and the barrier operator 14 to communicate and transfer power, while allowing the UPS 12 to provide standby and backup power to the barrier operator 14. The power lines 60-64 are comprised of conductive material, such as copper wire, that is suitable for carrying power needed by the barrier operator 14. However, the control type signals may be sent in a wireless format if the controllers 16 and 36 are appropriately configured. The operator power line 60 transfers power from the mains power source 25 or from the up-converter 38, to the barrier operator 14, depending on the state of the switch 46.

If the UPS 12 and the barrier operator 14 are separate components, then attachment connectors 69 may be used for connections therebetween. The attachment connectors 69 may be any type of electrical connector suitable for connecting electrical wires, such as a plug-type connector. Additionally, the connectors 69 allow an existing barrier operator 14 to transfer signal and power lines via 60-66 between the UPS 12. Accordingly, a user may purchase the UPS 12 separately and attach it to an existing barrier operator 14 without having to replace the entire barrier operator 14.

During normal conditions, when mains power 25 is operating; and during backup power conditions, when mains power 25 has failed, the backup power source 40 continuously supplies low-voltage DC power to the operator controller 16 and the operator receiver 26 via the standby controller power line 62. Alternatively, instead of supplying standby power to both the operator controller 16 and the operator receiver 26, the standby power may be supplied only to the operator receiver 26 via the standby receiver power line 64. In either case, the low-voltage standby power is used to allow the operator controller 16 and/or operator receiver 26 to remain responsive, when mains power 25 has failed, to any incoming communication signals requesting activation of the access barrier 15 that are received from the remote transmitter 28 or the wall station transmitter 29. Briefly, if mains power 25 fails, and the operator receiver 26 makes a preliminary detection of a potentially transmitted communication signal from an authorized user, the operator controller 16 processes the user's request by sending a "wake up" signal on the UPS control line 66 to the UPS controller 36. The "wake up" signal initiates activation of the up-converter 38 and toggles the switch 46 to transfer the up-converted high voltage AC backup power through the operator power line 60, although it is contemplated that the switch 46 may be toggled when the UPS controller 36 detects the failure of mains power 25. As a result, the barrier operator 14 remains operational during a power failure of mains power 25.

Additionally, it is also contemplated that when mains power 25 has failed, the operator receiver 26 is able, while operating on standby DC power, to make an initial determination of whether the carrier frequency used to transmit the wireless communication signals from the transmitters 28/29 are compatible with the barrier operator 14. In this regard, Receive Signal Strength Indication (RSSI), or carrier preamble counting could be used in evaluating the carrier of the received wireless signal, however other techniques could be used. If a valid carrier from a compatible transmitter 28 is detected by the operator receiver 26, using the above techniques, the operator receiver 26 transmits the "wake up" signal to the UPS controller 36, via the UPS control line 66. The UPS controller 36 then initiates the transfer of high-voltage AC power to the operator controller 16 via switch 46, as previously discussed. Once the operator controller 16 is fully powered, the operator controller 16 can further "authenticate" the transmitted data to determine if the signal is coming from a wireless transmitter that has been previously learned or paired to the barrier operator 14. This procedure conserves the power of the backup power source 40, because only transmission signals that are found to have a compatible carrier for use with the barrier operator 14 cause the UPS 12 to use the backup power source 40, activate the up-converter 38 and drain the backup power source 40 so that further authentication of the data contained in the communication signal can be performed.

Figure 5A:
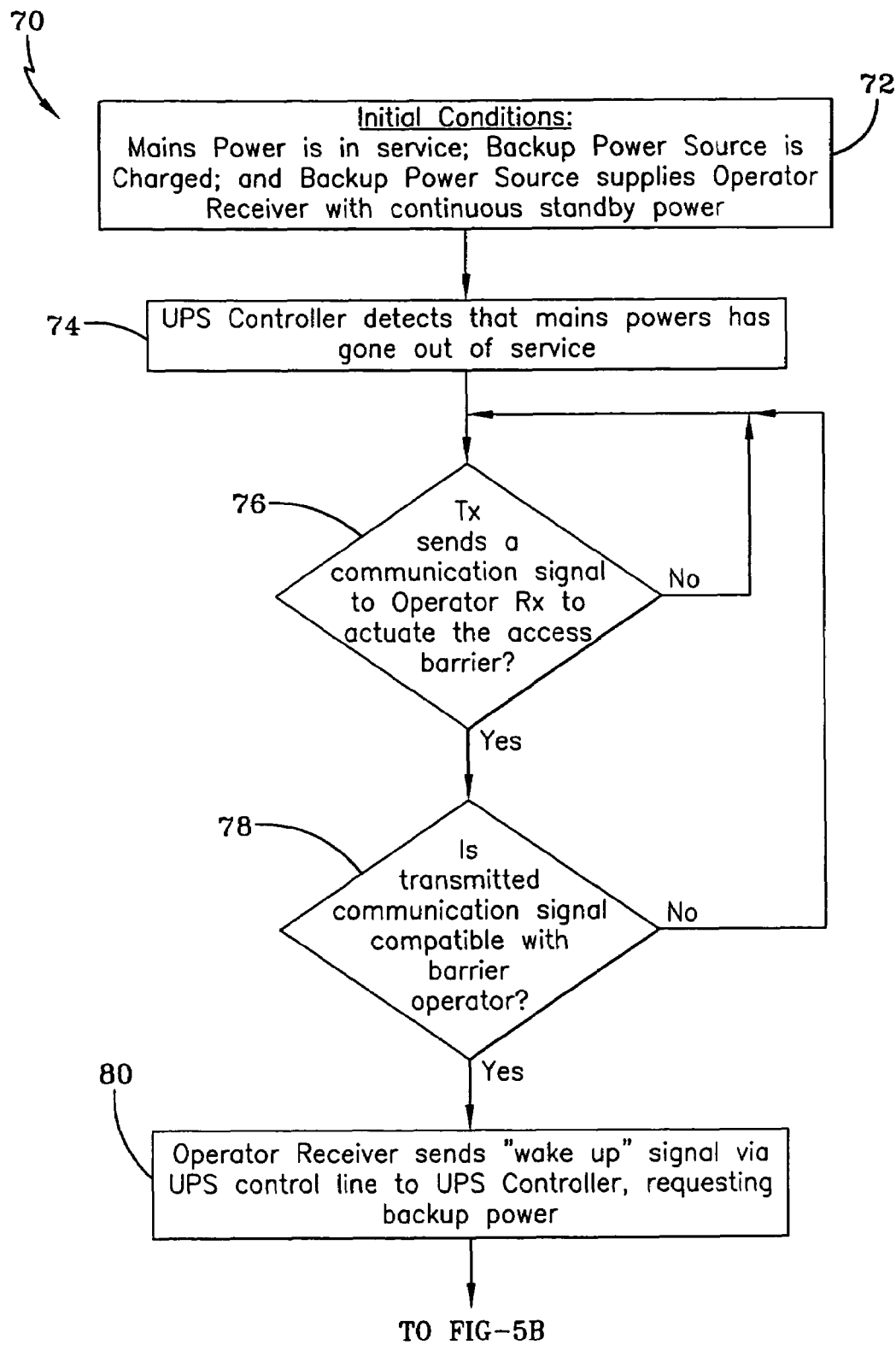
FIGS. 5A-C show an operational flowchart highlighting the operation of the UPS when mains power fails, and the UPS is activated.
Figure 5B:
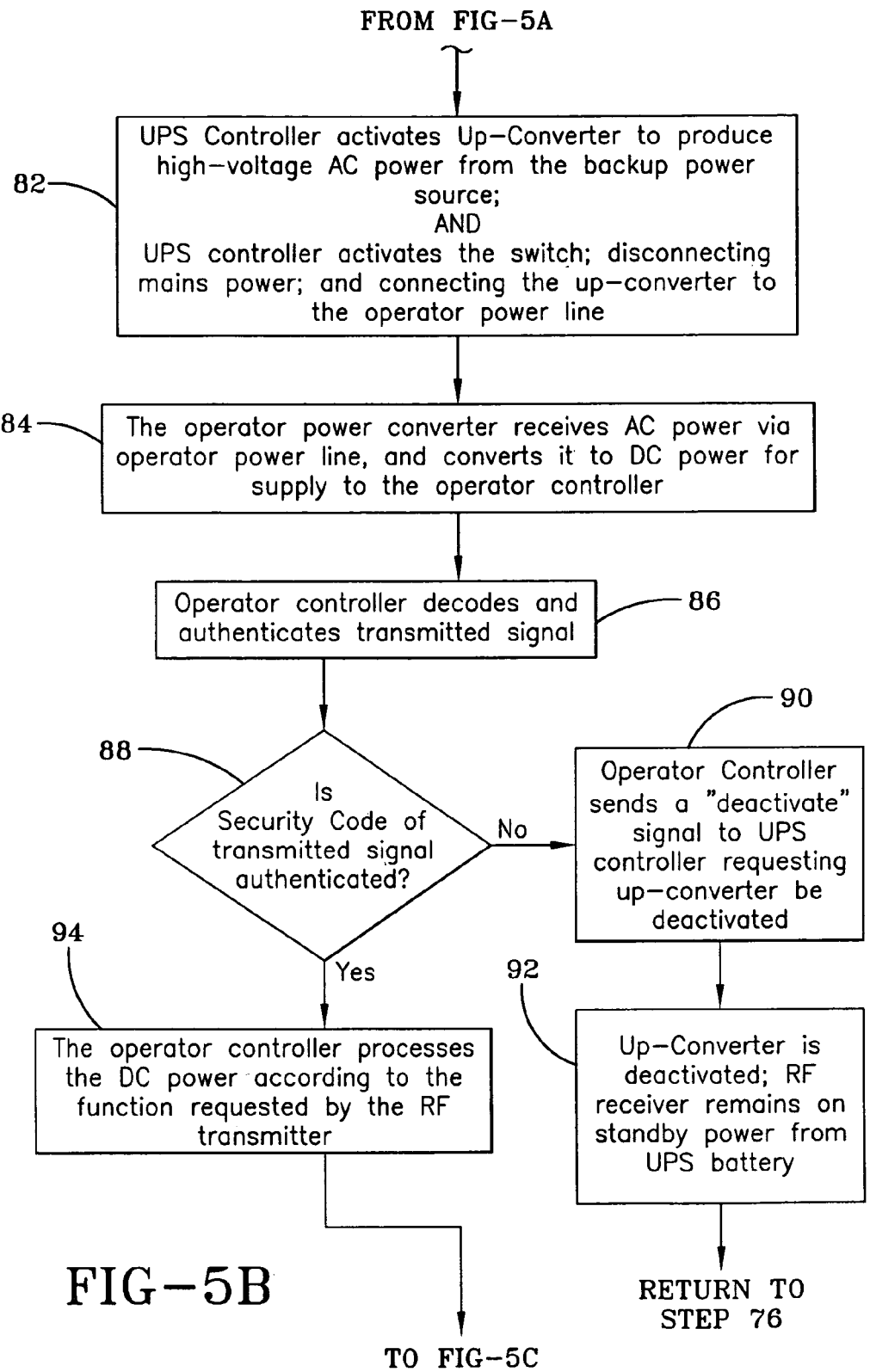
Figure 5C:
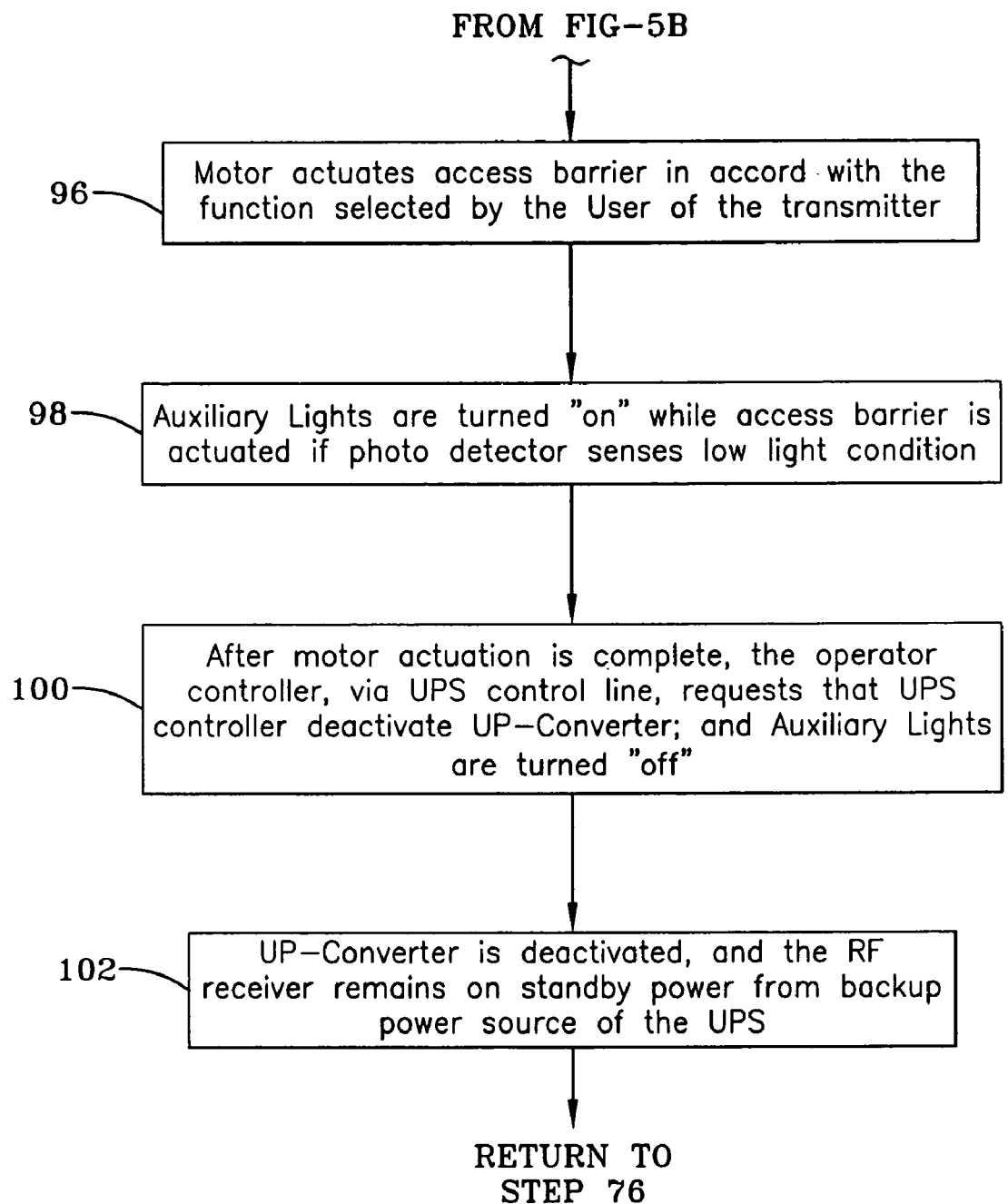

Turning now to FIGS. 5A-C, the operational steps of the system 10 are designated generally by the numeral 70 and illustrate the steps taken when mains power 25 fails and the UPS 12 is utilized to maintain operability of the barrier operator 14. Initially, at step 72, mains power 25 is operational, and the backup power source 40 is fully charged, allowing the UPS controller 36 to continuously supply standby power to the operator receiver 26. However, at step 74, mains power 25 to the barrier operator 14 has failed, and as such, is no longer detected by the UPS controller 36 and the operation of the barrier operator 14 is temporarily suspended. At step 76, the operator receiver 26 detects whether any transmitter has sent a communication signal requesting that the access barrier 14 be actuated. Next, at step 78, if a signal is sent by the transmitter 28, it is analyzed using RSSI, carrier preamble counting, or other suitable techniques to initially determine if the transmitted signal has a carrier frequency that is compatible with the barrier operator 14. If so, then the process proceeds to step 80, where the operator receiver 26 requests backup power by sending a "wake up" signal via the UPS control line 66 to the UPS controller 36. If either of the conditions are not met at steps 76 or 78, then the process returns to step 76.

At step 82, in response to the received "wake up" signal, the UPS controller 36 activates the up-converter 38, which converts the DC voltage of the back-up power source to a high AC voltage. Somewhat simultaneously, the UPS controller 36 toggles the switch 46 to disconnect the mains power 25 from the operator power line 60 and connect the high voltage AC power from the up-converter 38 to the operator power line 60. Next, at step 84, the operator power converter 22 receives the AC power from the up-converter 38 via the operator power line 60, and converts it to DC power, in the case that a DC motor 18 is used, for transfer to the operator controller 16. If an AC motor 18 is used, then no converter 22 is needed for the operation of the barrier operator 14. Continuing to step 86, the fully powered operator controller 16 decodes and begins authenticating the data contained within the communication signal received by the operator receiver 26. The authentication of the request signal is a security feature, and is done to ensure that only transmitters 28 which have been previously learned or paired to the barrier operator controller 16 are allowed to move the access barrier 15. Next, at step 88, if the operator controller 16 does not authenticate the request signal of the transmitter 28, then the operator controller 16 sends a "deactivate" signal to the UPS controller 36, as indicated in step 90. At step 92, the UPS controller 36 in turn deactivates the up-converter 38, and the operator receiver 26 is returned to its standby state by the supply of power from the backup power source 40. However, if at step 88, the operator controller 16 does authenticate the request signal of the RF transmitter 28, then the process proceeds to step 94, where the operator controller 16 processes the converted DC power in accordance with the desired function transmitted by the user. For example, if the remote user transmits a communication signal using the transmitter 28, indicating that the access barrier be closed, then the operator controller 16 utilizes the supplied DC power to actuate the motor 18 in such a manner as to close the access barrier 15, as indicated in step 96. Furthermore, at step 98, while the access barrier is being moved, the auxiliary lights 33 and 35 may be turned "on." At step 100, once the operator controller 16 and motor 18 have completed the requested operation, the auxiliary lights 33 and 35 are turned "off," either immediately or a predetermined period of time later, and the operator controller 16 sends a control signal to the UPS controller 36 requesting that the up-converter 38 be deactivated. Finally, at step 102, the up-converter 38 is deactivated, and the operator receiver 26 returns to step 76, where the operator receiver 26 remains on standby power, awaiting a communication signal from the transmitters 28/29.

Figure 6A:
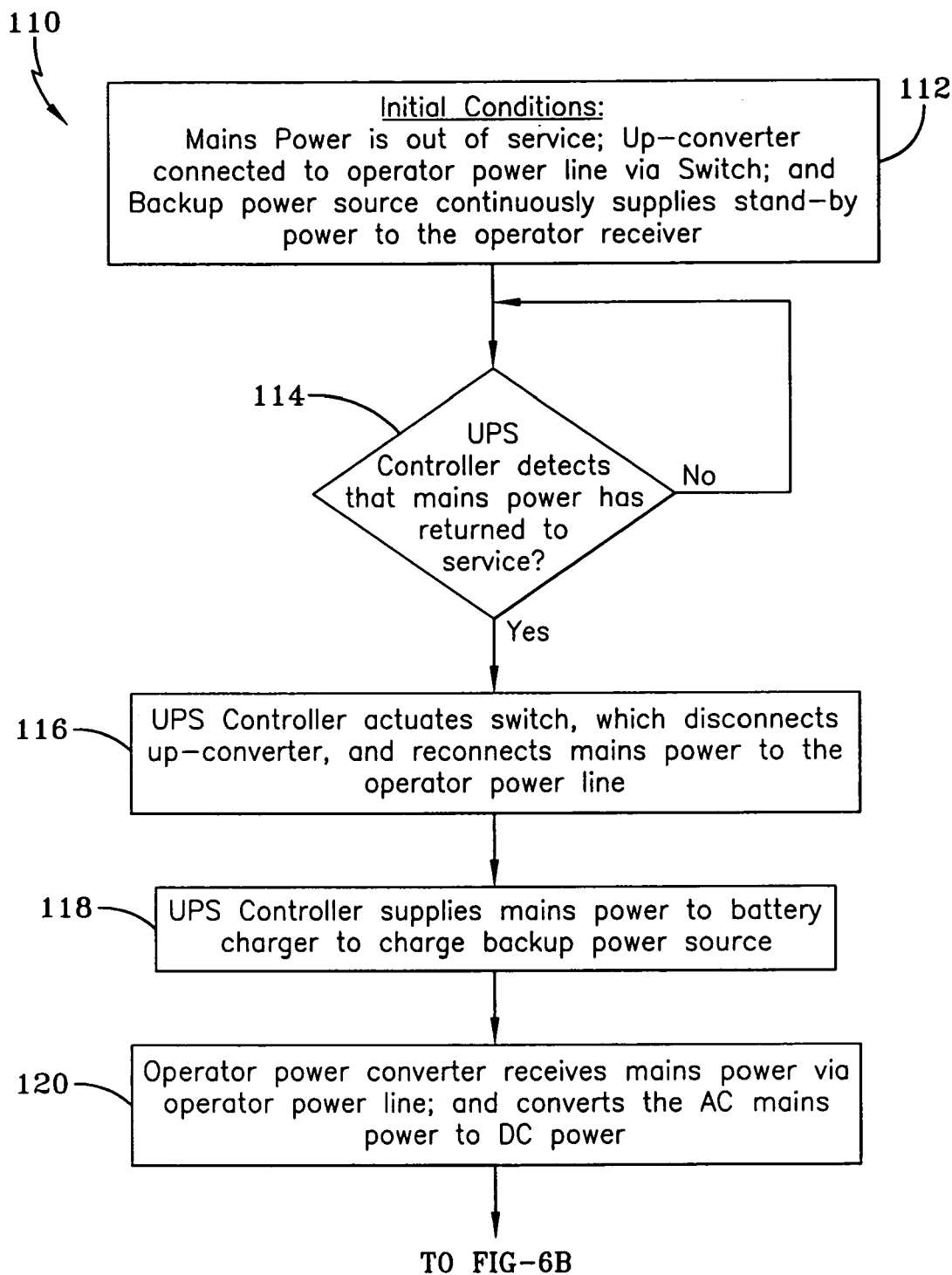
FIGS. 6A-B show an operational flowchart highlighting the operation of the UPS when the UPS is activated and the mains power source returns to service.
Figure 6B:
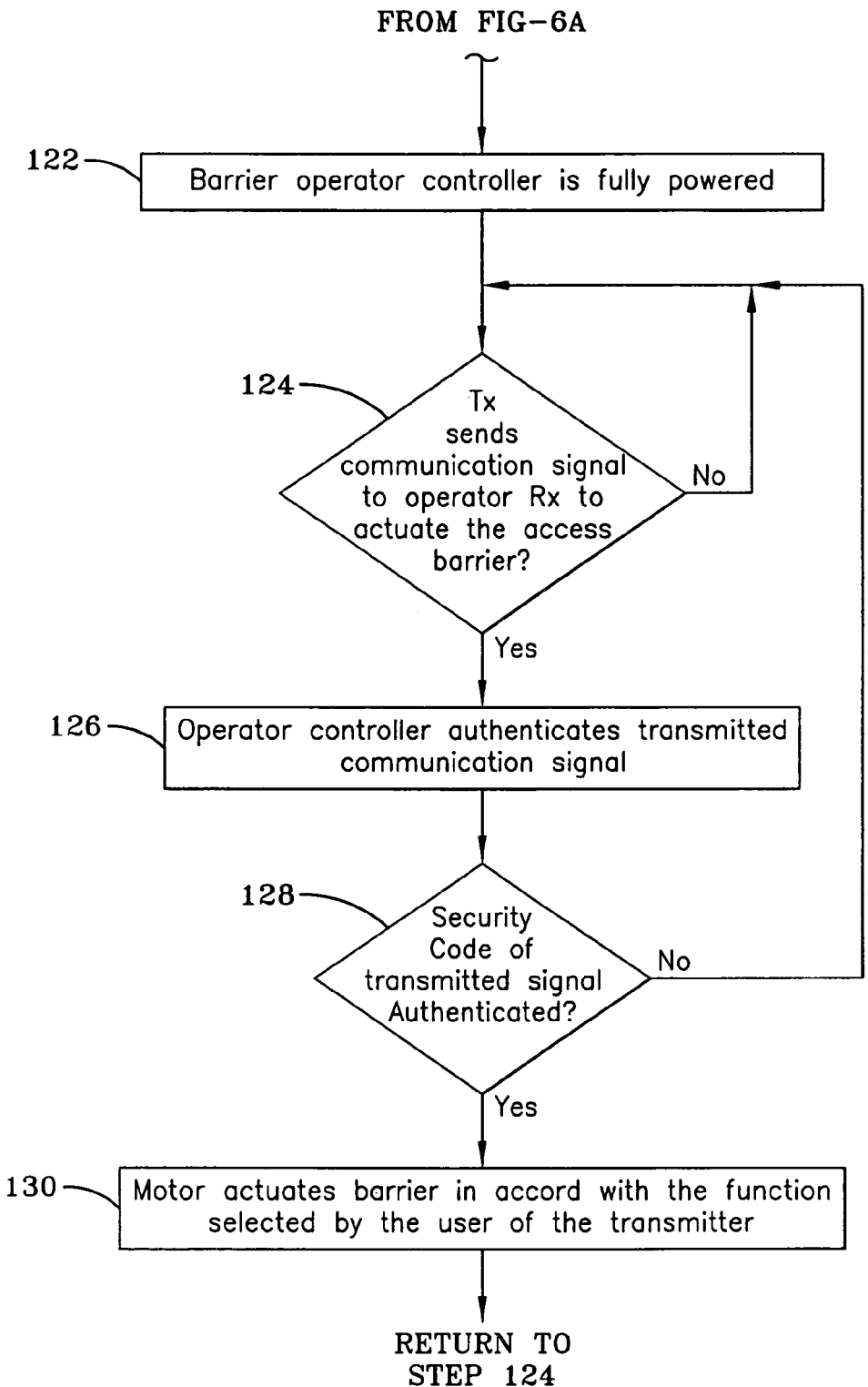

FIGS. 6A-B illustrate the operational steps, designated generally by the numeral 110, which take place when the UPS 12 is providing backup power, and then mains power 25 subsequently returns to service. Beginning, at step 112, mains power 25 is out of service, and the UPS 12 is in backup operation, whereby the mains power source 25 is disconnected from the barrier operator 14, and the up-converter 38 is connected to the barrier operator 14 via the operator power line 60. Additionally, the operator receiver 26 continues to receive standby power from the backup power source 40. At step 114, the UPS controller 36 monitors the mains power source 25. If mains power 25 returns to service, then at step 116 the UPS controller 36 toggles switch 46, causing the up-converter 38 to be disconnected from the operator power line 60 while reconnecting the mains power source 25 to the operator power line 60. If mains power 25 has not returned then step 114 is repeated. Continuing to step 118, the UPS controller 36 activates the battery charger 42 to begin re-charging of the backup power source 40. At step 120, the operator power converter 22 receives the mains power 25 via the operator power line 60, and converts the AC mains power 44 into DC power that is compatible with the DC motor 18. However, if an AC motor 18 is used, then the power converter 22 is not used with the barrier operator 14, and the AC power is coupled directly to the operator controller 16.

At step 122, the barrier operator 14 is fully powered by AC mains power source 25. At step 124, the operator receiver 26 monitors for the transmission of a communication signal sent from the transmitter 28 containing the desired function request. Once the communication signal is received by the operator receiver 26, it is then authenticated by the operator controller 16, using the techniques discussed earlier. If the communication signal is not validly authenticated as indicated at step 128, then the transmitted signal is disregarded, and the barrier operator 14 does not perform the function requested by the user. As a result, the process returns to step 124 where the operator receiver 26 continues to monitor for communication signals sent by the transmitter 28. If at step 128, the transmitted signal is authenticated, then the process continues to step 130 where the operator controller 16 processes the DC power from the operator power converter 22 in accordance with the desired function sent by the transmitter 28. Thus, the motor 18 moves the access barrier 15 in the manner desired by the user of the system 10 and the process returns to step 124.

Figure 7:
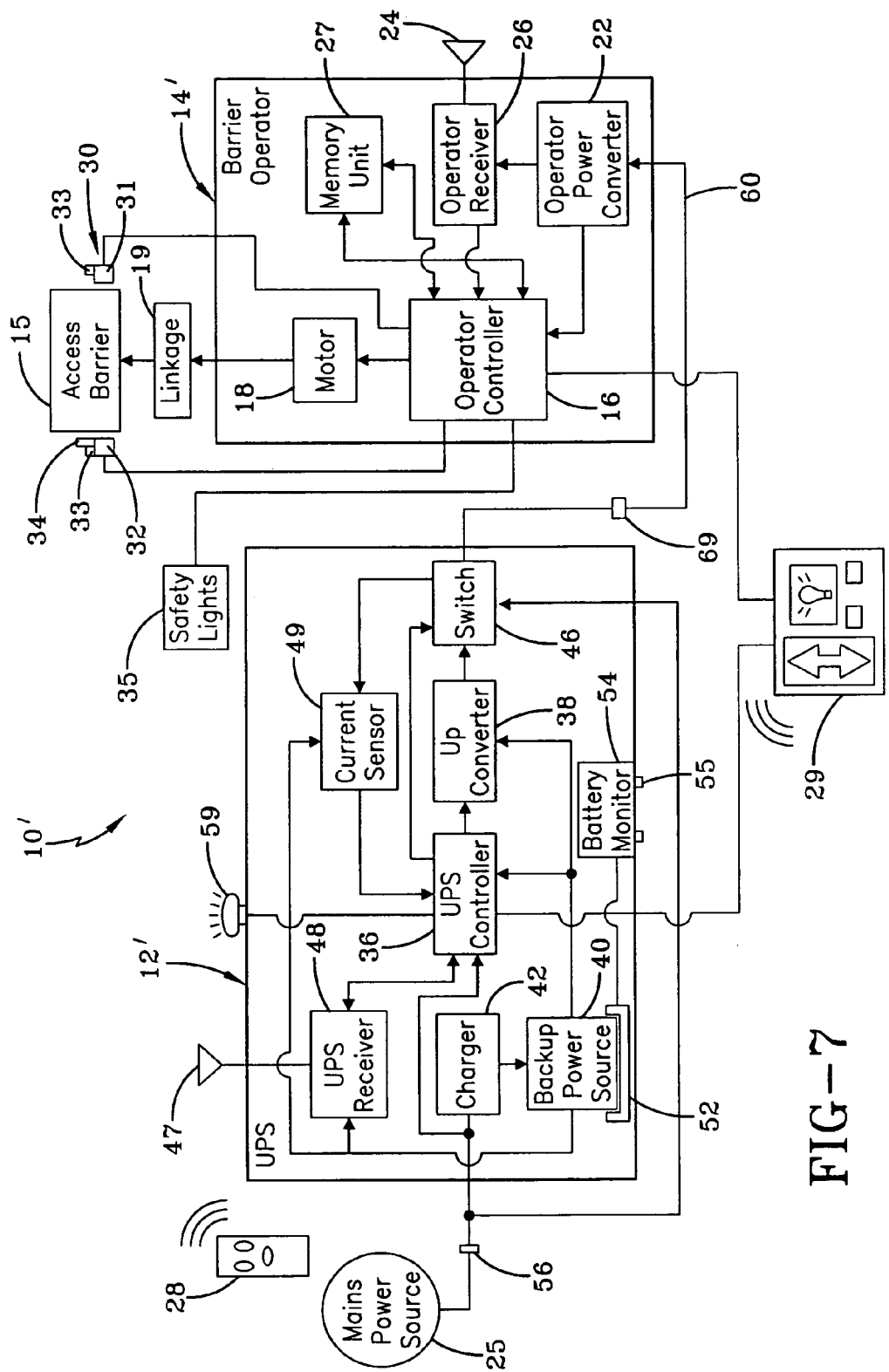
FIG. 7 is a schematic diagram of an alternate embodiment of the uninterruptible power source (UPS) for a barrier operator.

FIG. 7 shows an alternative embodiment of the system designated generally by the numeral 10' which is distinguishable over the embodiments shown in FIGS. 1-6. The system 10' includes many of the same components as associated with the system 10, but there are slight variations in the uninterruptible power source and the barrier operator and, as such, they are provided with prime designations (e.g. barrier operator 14'). In any event, the UPS 12' is activated during a mains power 25 failure, not by receipt of a security code from a transmitter, but rather by a generic binary pulse train that is contained within all communication signals sent by most all barrier operator transmitters that are commercially available and in use. Specifically, the barrier operator 14' of the present embodiment comprises an operator controller 16, a motor 18, an operator power converter 22, an operator receiver 26, and a memory unit 27. The operator controller 16 receives input signals and generates output signals to control the various functions of the components associated with the system 10. Additionally, the operator controller 16 is a logic control that may be implemented using a general purpose, or application specific semiconductor based microprocessor/micro-controller that provides the necessary hardware, software, and memory to carry out the desired functions of the barrier operator 14'. One function carried out by the operator controller 16 is to route the power supplied by the UPS 12' (either mains power or backup power) and supply it to the motor 18. The motor 18 is connected to the access barrier 15 by linkage 19, as previously discussed with respect to FIG. 1. Additionally, to assist in the movement of the access barrier 15, the operator controller 16 controls various aspects of the motor's 18 operation including but not limited to speed, torque, and motor rotation direction. The motor 18 may comprise either an AC or DC motor, and it should be appreciated that the operator controller 16 could use pulse width modulation (PWM) as a technique to control the motor's 18 operation.

The barrier operator 14' also includes an operator power converter 22, as previously discussed, which is connected to the operator controller 16 and to the operator receiver 26. When mains power 25 is operating or when the UPS 12 is supplying backup power, the operator power converter 22 receives the AC power 25 supplied from the UPS 12. Briefly, when a DC motor 18 is used, the operator power converter 22 converts the AC output of the UPS 12' (either mains power or backup power) into DC power and supplies it to the operator controller 16 for use with the DC motor 18. Additionally, the power converter 22 may be comprised of a power rectifier or related device that is capable of converting AC mains power 25 into DC power. It should be appreciated that if an AC motor 18 is used in conjunction with the barrier operator 14, then the operator power converter 22 is not provided with the present embodiment of the system 10. As a result, the AC power is supplied directly to the operator power converter 22 and the operator controller 16.

Also connected to the operator controller 16 are an antenna 24 and an operator receiver 26. This allows a user to remotely actuate the barrier operator 14 using various functions provided by the transmitter 28. For example, a remote user can open or close the access barrier 15 remotely by selecting the appropriate function on the transmitter 28. As will be discussed more fully, the operator receiver 26 and the transmitter 28 generally communicate using data encoded onto radio waves. However, the communication signals used between the transmitter 28 and the operator receiver 26 may be implemented using the entire spectrum of communication frequencies and any suitable protocol, including but not limited to: radio frequency (RF) waves, microwaves, light waves, and sonic waves.

A memory unit 27 is connected to the operator controller 16. The memory unit 27 allows the operator controller 16 to store and retrieve data relating to the learning function that allows the operator receiver 26 and transmitter 28 to be paired together, as discussed with respect to FIG. 1. Additionally, the memory unit 27 may be integrated with the operator controller 16, or it may be a separate component as shown in FIG. 7. The memory unit 27 may also be comprised of RAM (random access memory) of any suitable type and capacity for use in a barrier operator 14. One example of memory that could be used includes flash memory. In addition to having a RAM portion, the memory unit 27 may include a ROM (read only memory) portion that may be used to store programs for use by the operator controller 16 directed to various functions the barrier operator 14 may provide to the user.

A wall station transmitter 29 may also be connected to the operator controller 16 and to UPS controller 36. The wall station transmitter 29 offers the user operating functions, which allow the user to actuate the barrier operator 14 as previously discussed with respect to the wireless transmitter 28. The wall station 29 may also be a wireless type transmitter that operates in the same manner as the remote transmitter. It will also be appreciated that different types of transmitters such as keyless entry or hands-free may be learned and operative with the operator controller 16.

Optionally connected to the operator controller 16, is a photoelectric sensor 30, with integrated auxiliary lights 33, which operate and function in a manner as previously discussed with respect to FIGS. 1-4. Further, one or more safety lights 35 may also be connected to the operator controller 16.

The UPS 12' comprises a UPS controller 36, an up-converter 38, a backup power source 40, a charger 42, a switch 46, a UPS antenna 47, a UPS receiver 48, a current sensor 49, and a mains power connector 56. The UPS controller 36 is a logic control that may be implemented using a general purpose, or application specific semiconductor based microprocessor/micro-controller that provides the necessary hardware, software, and memory to carry out the functions to be described.

Connected to the UPS controller 36, is the up-converter 38, that when activated by the UPS controller 36, increases the low voltage DC power supplied by the backup power source 40 to high voltage AC power. For example, if a 12 VDC backup power source 40 is used, the up-converter 38 may increase the voltage to 120 VAC for delivery to the barrier operator 14. The backup power source 40 may comprise a battery or any other energy source that is capable of supplying DC power, however a battery is typically used. The battery could be of any type suitable for powering a barrier operator 14, including, but not limited to: lead-acid, lithium ion, nickel metal hydride, or nickel cadmium, sodium/sulfur cells, nickel/sodium cells, manganese-titanium cells, rechargeable alkaline manganese cells, nickel zinc cells, iron-nickel cells, iron silver cells, redox (liquid electrode) cells, lithium-sulfur cells, and supercapacitor type cells. If needed, the battery may be user-replaceable. Such disposable type cells may include, but are not limited to Leclanche' cells, alkaline cells, mercury oxide cells, zinc/air cells, aluminum air cells, lithium cells and lithium iron cells. Use of disposable type batteries may necessitate re-configuration of the UPS.

The UPS 12' also includes a charger 42 connected to the mains power source 25, and the backup power source 40.

When the backup power source 40 comprises a battery, and mains power 25 is in operation, the charger 42 charges the battery 40, using known techniques. As a result, the capacity of the battery 40 is maintained at an optimum level.

The switch 46, connected to the UPS controller 36, receives as inputs, the AC power from the up-converter 38, and the AC power from the mains power source 25. In the event a mains power 25 failure is detected by the UPS controller 36, the switch 46 is actuated causing the mains power source 25 to be disconnected and the up-converter 38 to be reconnected to the barrier operator 14. The switch 46 may be implemented using the various components previously discussed herein with regard to FIG. 1.

Also connected to the UPS controller 36, backup power source 40, and switch 46 is a current sensor 49. The current sensor 49 allows the UPS controller 36 to monitor the amount of electrical current being drawn by the barrier operator 14 during the period when mains power 25 has failed. In other words, when mains power 25 fails, the UPS 12' is immediately activated, and supplies up-converted backup power to the barrier operator 14. While the UPS 12' is activated, the current sensor 49 monitors the amount of current being drawn by the barrier operator 14' from the UPS 12'. If a current drain is detected by the sensor 49, indicating that the barrier operator 14' is being actuated, then the UPS 12' will continue to supply backup power to the barrier operator 14. However, if the sensor 49 detects a current drop below a certain threshold, for a predetermined duration, the UPS 12' is deactivated and the UPS controller 36 turns on the UPS receiver 48 which receives standby power from the backup power source 40. After the UPS 12' has been deactivated and a user desires to actuate the barrier operator 14 via the transmitter 28 or wall station transmitter 29 (to be discussed), the current sensor 49 detects a current drain by the barrier operator 14 and activates the UPS 12' to supply backup power to the barrier operator 14. The current sensor 49 may comprise any sensor suitable for measuring current being drawn from a barrier operator 14. It is also contemplated that the current sensor 49 may be integrated into the UPS controller 36, in lieu of being a separate component as shown in FIG. 7.

Another component connected to the UPS controller 36 is a UPS antenna 47 and the UPS receiver 48. The UPS antenna 47 and receiver 48 allow a user to activate the UPS 12 using any type of remote transmitter when mains power 25 has failed. Briefly, if mains power 25 has failed, and a user desires to move the access barrier 15, the user first activates the UPS 12' and then actuates the barrier operator 14'.

Figure 8:
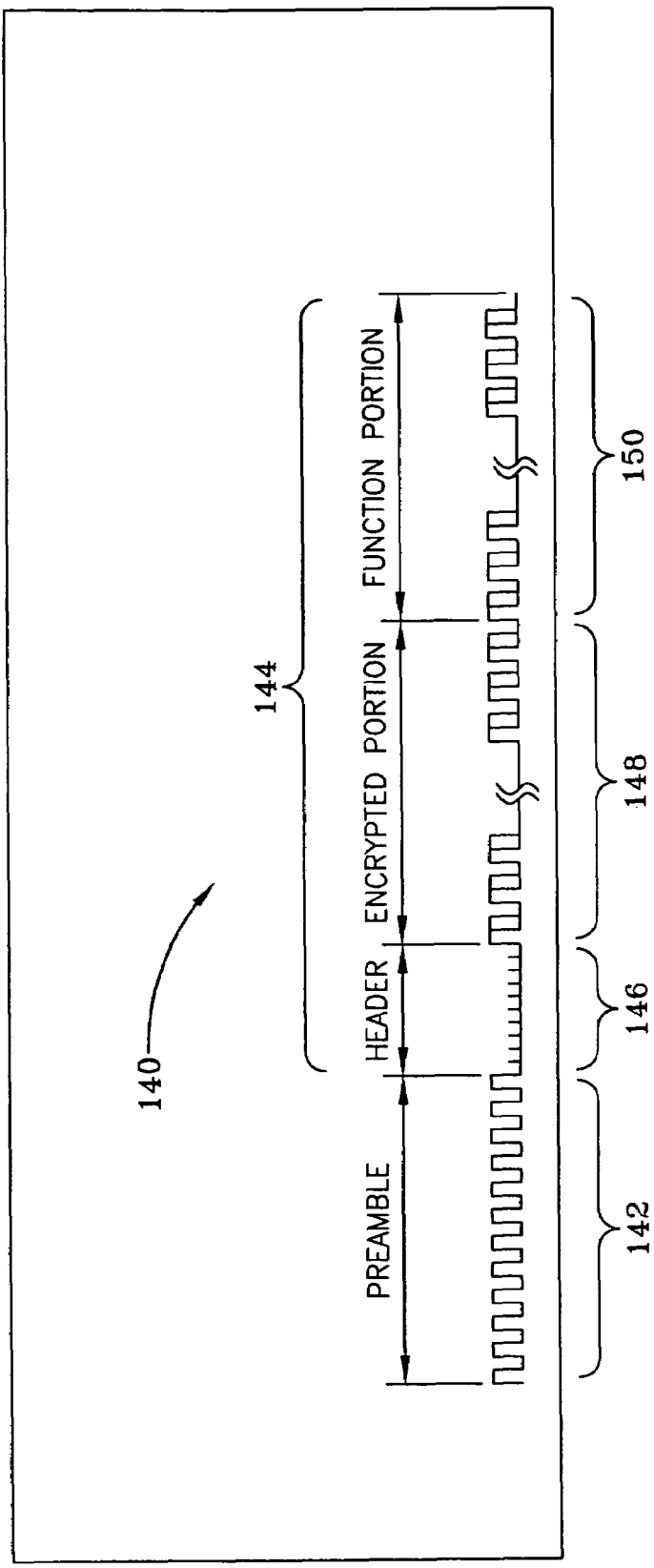
FIG. 8 is a diagram of a data word contained in a communication signal between a transmitter and the barrier operator.

The communication signals used by the transmitters, the UPS receiver 48 and the operator receiver 26 are encoded with data in the form of binary pulses as shown in FIG. 8. These binary pulses comprise a data word 140 having discrete regions of varying data that carryout certain functions provided by the system 10 and 10'. The data word 140 comprises a preamble 142 portion, which includes industry-standard synchronization data common to all commercially available transmitters and receivers, and a non-standardized, operation data portion 144 which contains data that is unique to a predetermined group of transmitters 28/29 and operator receivers 26. The operation data 144 may comprise a header portion 146, an encrypted portion 148, and a function portion 150. The encrypted portion 148 may contain a security code, such as a rolling or fixed code, that is used to authenticate the transmitted data word 140 to ensure that only previously paired or learned transmitters 28 and operator receivers 26 are able to interpret and carryout the function identified in the function portion 150. The function portion 150, as stated, contains the data corresponding to the specific function the user desires to have carried out by the barrier operator 14. Additionally, the operation data 144 may be encrypted so that only predetermined UPS controllers and operator controllers are able to interpret the operation data 144. It is also contemplated that the data word 140 provided by KEELOQ® may be used in accordance with the present system 10, 10'.

In contrast to the unique data contained in the operation data portion 144, the preamble portion 142 comprises a repetitive binary pulse train that alternates between high and low states at uniform intervals. The format of the binary pulse train in the preamble portion 142 is standardized or generic, and is used by all commercially available transmitters and receivers to allow them to synchronize with each other. Once synchronized, the data following the preamble 142 can be properly transmitted by the transmitter, and received by the receiver. Thus, in the case of the present system 10', the operation data 144 that follows the preamble 142 can be transmitted by the transmitters 28/29 and received by either the operator receiver 26, or the UPS receiver 48. One type of pulse train that is commonly used for the preamble is one having a 50% duty cycle. Further, the preamble portion 142 is of a sufficient duration that allows the UPS receiver 48 to identify the preamble 142 from any environmental noise.

The system 10' makes use of the standardized binary pulse train of the preamble 142, by configuring the UPS receiver 48 to only be responsive to the preamble portion 142, of the transmitted data word 140. Therefore, if UPS receiver 48 detects a transmitted signal containing the standard binary pulse train of the preamble 142, then an "activation" signal is sent to the UPS controller 36. In response to the "activation" signal, the UPS 12 is activated and begins to supply backup power to the barrier operator 14 via operator power line 60. And, if desired, receipt of the preamble signal may result in the controller illuminating the light 59. More fully, when mains power 25 has failed and the battery charger has been depleted to a predetermined threshold, the active UPS receiver 48 monitors for the presence of the preamble portion 142 of the data word 140 that is contained in the communication signal sent by the transmitter 28. When the UPS receiver 48 detects the presence of the preamble 142 for a predetermined period, the UPS 12' is activated, and backup power is thereby supplied to the barrier operator 14'. Thus, even though additional encrypted or non-encrypted operation data 144 follows the preamble 142 when a communication signal is transmitted, the UPS receiver 48 is configured to be only responsive to the preamble 142. Further, any operation data 140 that follows the preamble 142 is disregarded by the UPS receiver 48 and/or UPS controller 36, and is not used or acted upon in any manner by the UPS 12'. Once energized, the barrier operator 14' must receive another data word 140 which is validated in a normal manner. As such, a first data word transmission is used to waken the UPS 12' and a second data word transmission is used to perform the desired function of the barrier operator 14'.

It will also be appreciated that the operator receiver 26 may be directly integrated into the circuitry of the operator controller 16, but the operator receiver 26 may be a separate functional component that is powered independently from the operator controller 16, as shown in FIG. 7. Additionally, the UPS 12' may include the optional battery heater 52 and battery monitor 54 as discussed in regard to FIG. 1. A mains power connector 56 may be used to connect and disconnect the UPS 12' to and from the mains power source 25. And a light 59 may be selectively illuminated by the controller 36 depending upon the operational condition of the UPS 12'. Once energized, the controller 16 may illuminate lights 35 and 33.

Continuing with FIG. 7, the operator power line 60 is used to connect the UPS 12' to the barrier operator 14'. The operator power line 60 is an electrical conductor that supplies mains power 25 or backup power from the up-converter 38 when mains power 25 has failed. And a connector 69 may be used according to the concepts previously discussed with respect to FIG. 1. The connector 69 allows a user to connect or remove the UPS 12' to or from the barrier operator 14' in a user-friendly manner.

Figure 9A:
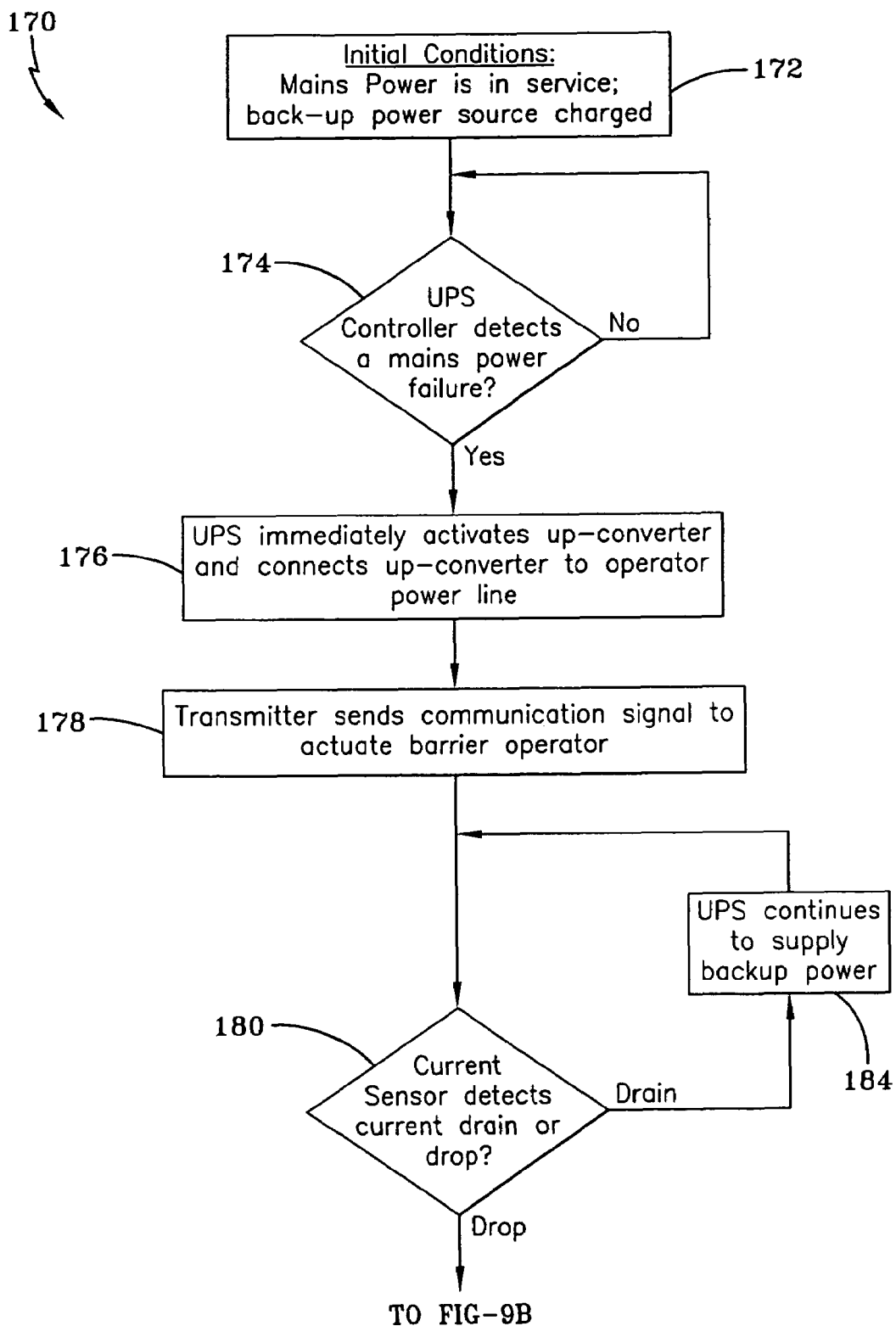
FIGS. 9A-C show an operational flow chart highlighting the operation of an alternate embodiment of the UPS when mains power has failed, and the UPS is activated.
Figure 9B:
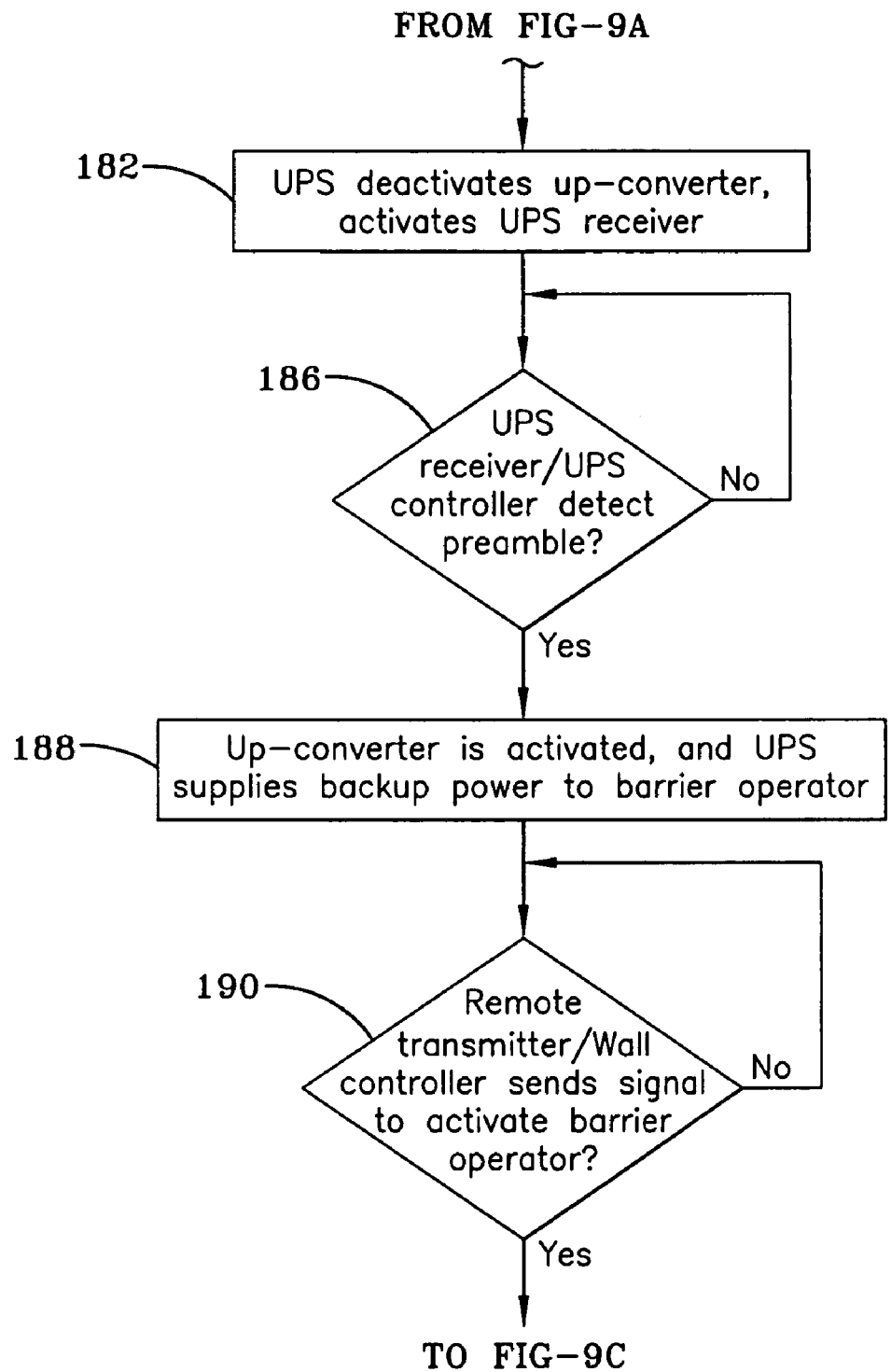
Figure 9C:
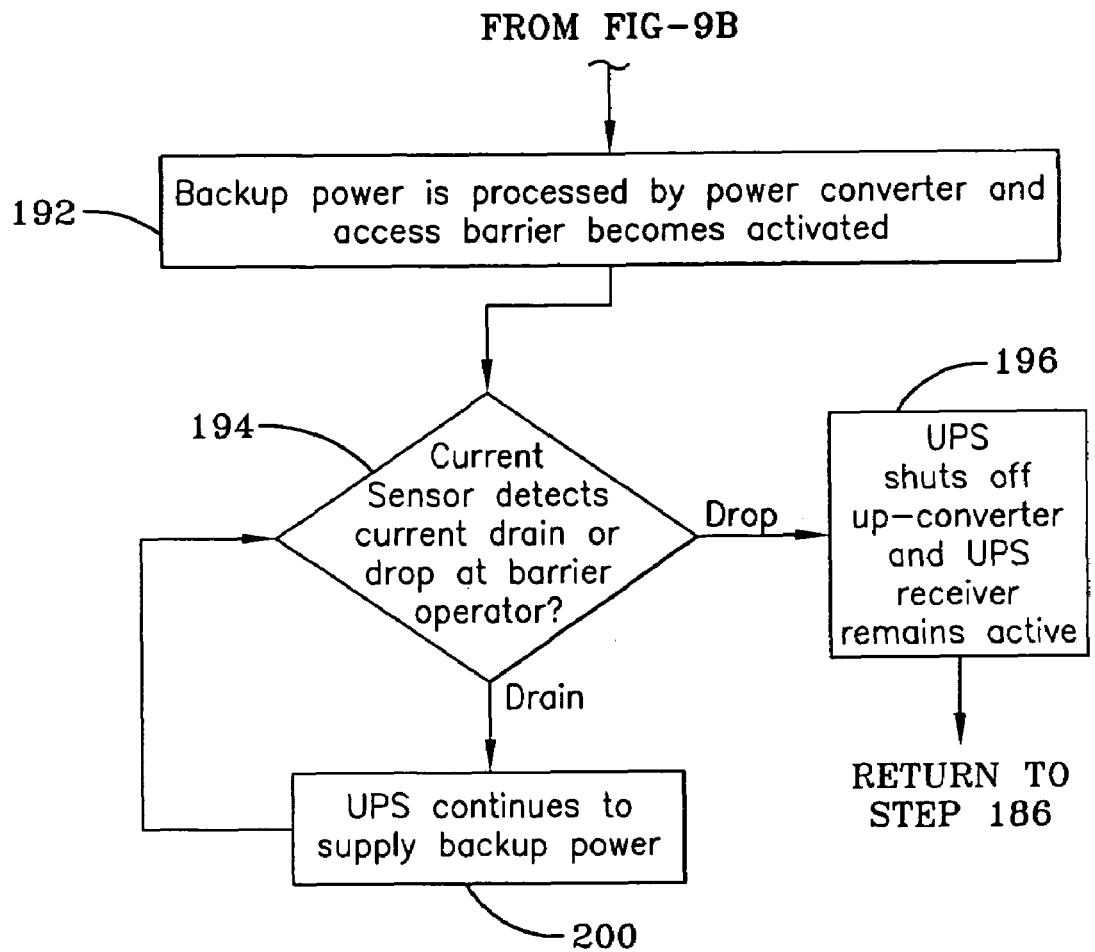

The flow chart shown in FIGS. 9A-C illustrate the operational steps, indicated by the numeral 170, which are taken by the system 10' when mains power 25 fails and the UPS 12' is implemented. At step 172, mains power 25 is in service and the charger 42 charges the backup power source 40. Next, at step 174, the UPS controller 36 determines whether mains power 25 has failed or not. If a failure is detected, the controller 36 activates the up-converter 38, and activates the switch 46 at step 176. The activation of the switch 46 causes the output of the up-converter 38 to be connected to the operator power line 60. At step 178 the barrier operator 14' is then capable of being actuated in accordance with the function transmitted by the remote transmitter 28, the wall station transmitter 29 or any other transmitter. At step 180, the current sensor 49 continuously monitors the current being drawn by the motor 18. If the current drops below a predetermined threshold, the process moves to step 182 and the up-converter 38 is deactivated by the UPS controller 36 and the UPS receiver 48 is energized. However, if the current does not drop, then the UPS 12' continues to supply up-converted backup power to the barrier operator 14' until the current drops below a certain threshold for a predetermined period of time, as indicated in step 184. Moving to step 186, after the UPS 12 has initially been activated, and then deactivated for the first time after a mains power 25 failure, the UPS receiver 48 monitors for the presence of the preamble 142 in the data word 140 sent in a communication signal by the transmitters 28/29. If the preamble 142 of a first communication signal is detected by the UPS receiver 48, then the process proceeds to step 188, where the up-converter 38 is activated, thus supplying backup power to the barrier operator 14. Additionally, the UPS 12' may also be activated by the wall station transmitter 29. At step 190 the operator controller 16 then determines whether the user has sent a second communication signal to the operator receiver 26, using either the transmitter 28 or the wall station transmitter 29, requesting actuation of the barrier operator 14 within a predetermined period of time. Next, at step 192, the up-converted AC backup power supplied by the up-converter 38 is processed by the operator power converter 22 into DC power, if a DC motor 18 is used with the barrier operator 14. However, if an AC motor 18 is being used, then the up-converted AC power supplied by the UPS 12 is directly passed through to the operator controller 16, making the operator power converter 22 unnecessary. The barrier operator 14 is then actuated according to the transmitted function sent to the operator receiver 26 by the transmitter 28 or wall station 29. Simultaneously, the current sensor 49, as indicated in step 194, monitors the electrical current being drawn by the barrier operator's motor 18. If the electrical current drawn by the motor 18 drops below a certain threshold for a predetermined period, the process moves to step 196, where the current sensor 49 sends a control signal to the UPS controller 36, causing the up-converter 38 to be deactivated. Once the UPS 12' is deactivated, the process returns to step 186, where the UPS receiver 48 resumes monitoring for the presence of a preamble transmitted by the transmitter 28 or the wall station transmitter 29. However, if at step 194, the current sensor 49 detects that electrical current is still being drawn by the motor 18, then the UPS 12 continues to supply up-converted AC backup power to the barrier operator 14', as indicated in step 200. In addition to actuation of the barrier operator 14, the auxiliary lights 33 of the photoelectric sensor 30, the safety light 35 or the light 59 may be illuminated according to the operating parameters previously discussed. The current sensor 49 continuously monitors the electrical current being drawn by the barrier operator 14'. Thus, as shown in step 194, when the barrier operator 14 has completed its operation cycle, a corresponding current drop will be detected by the current sensor 49, thus deactivating up-converter 38 and UPS 12'. Once the UPS 12' is deactivated, the process returns to step 186, where the UPS receiver 48 resumes monitoring for the presence of a preamble of a transmitted communication signal sent by the remote transmitter 28 or wall station transmitter 29.

Figure 10:
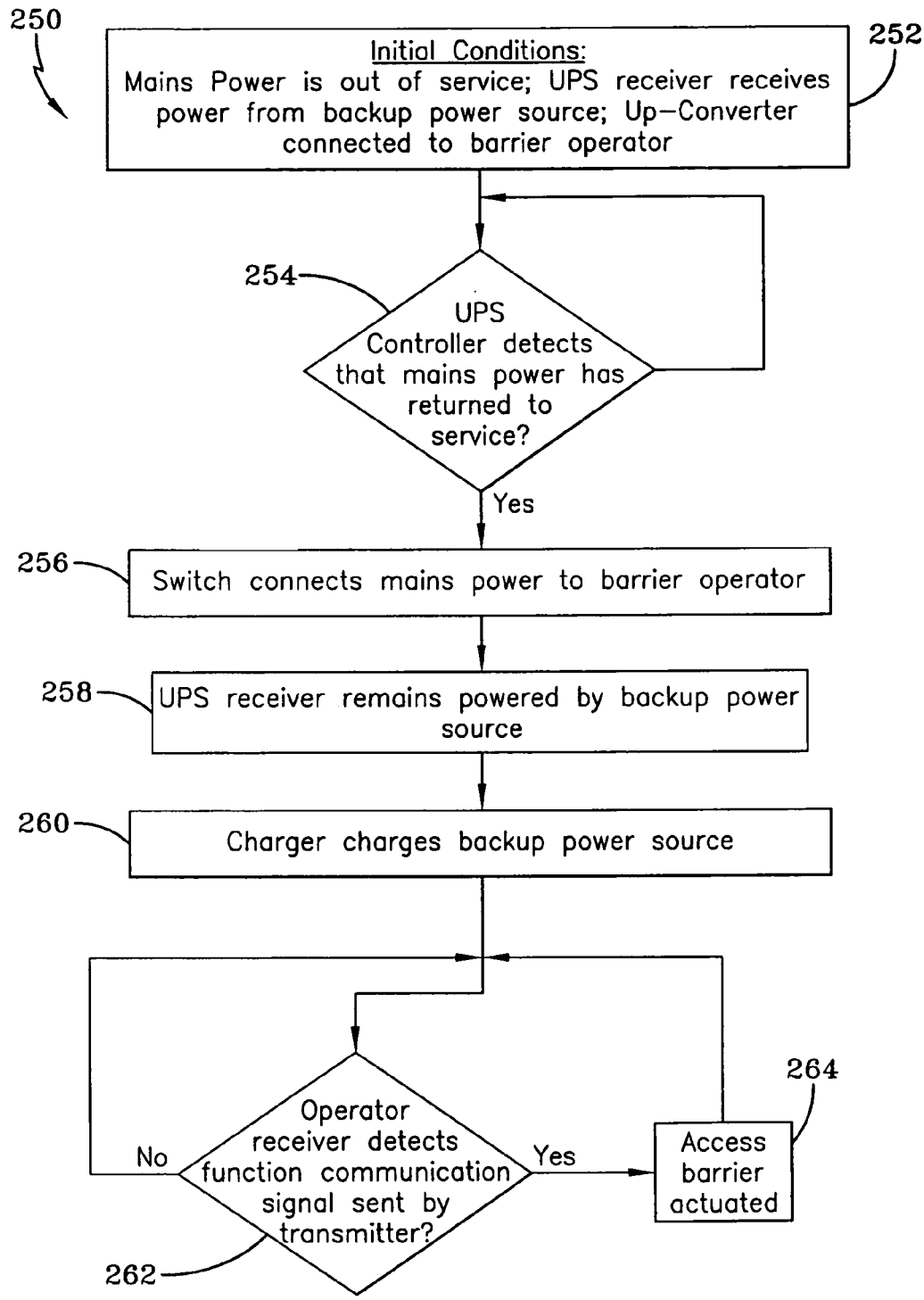
FIG. 10 is an operational flow chart showing the operation of the alternate embodiment of the UPS when the UPS is activated and the mains power source returns to service.

The flow chart shown in FIG. 10 illustrates the operational steps, indicated by the numeral 250, which are implemented by the embodiment shown in FIG. 7, when mains power 25 returns to service. At step 252, the UPS controller detects that mains power 25 is out of service, the UPS receiver 48 receives continuous power from the backup power source 40, and the up-converter 38 is connected to the operator power line 60 via the switch 46. Proceeding to step 254, the UPS controller monitors the mains power source 25, to determine whether mains power 25 has returned to service. If the mains power 25 has returned to service, then the process continues to step 256, where the switch 46 disconnects the up-converter 38, and re-connects the mains power source 25 to the barrier operator 14' via the operator power line 60. Somewhat simultaneously, the UPS receiver 48 continues to receive power from the backup power source 40, even though the mains power 25 has returned to service, as indicated at step 258. This allows the UPS receiver 48 to remain responsive to a user's request to be activated immediately upon a mains power 25 failure. Additionally, at step 260, and somewhat simultaneously with step 258, the charger 42 resumes charging of the backup power source 40 and power is removed from the UPS receiver. Proceeding to the next step in the process at 262, the operator receiver 26 and operator controller 16 begin to monitor for communication signals again sent by the transmitter 28 or wall station 29 that request the barrier operator 14 be actuated. If at step 262, the operator receiver 26 detects a communication signal sent by the transmitter 28 or wall station transmitter 29, the up-converted AC mains power 25 is converted by the power converter 22 into DC power if a DC motor 18 is being used. However, if an AC motor 18 is being utilized, then the operator power converter 22 is not provided, and mains power 25 is passed directly to the operator controller 16. Once the power is in the appropriate format, either AC or DC, it is delivered to the operator controller 16 which processes the power, using methods previously discussed, to carry out the selected function transmitted by the remote transmitter 28 or wall station transmitter 29, as indicated at step 264. As a result, the barrier operator 14 actuates the access barrier 15 in accordance with the request sent by the user. The process then returns back to step 262 where the operator receiver 26 monitors for communication signals.

Figure 11:
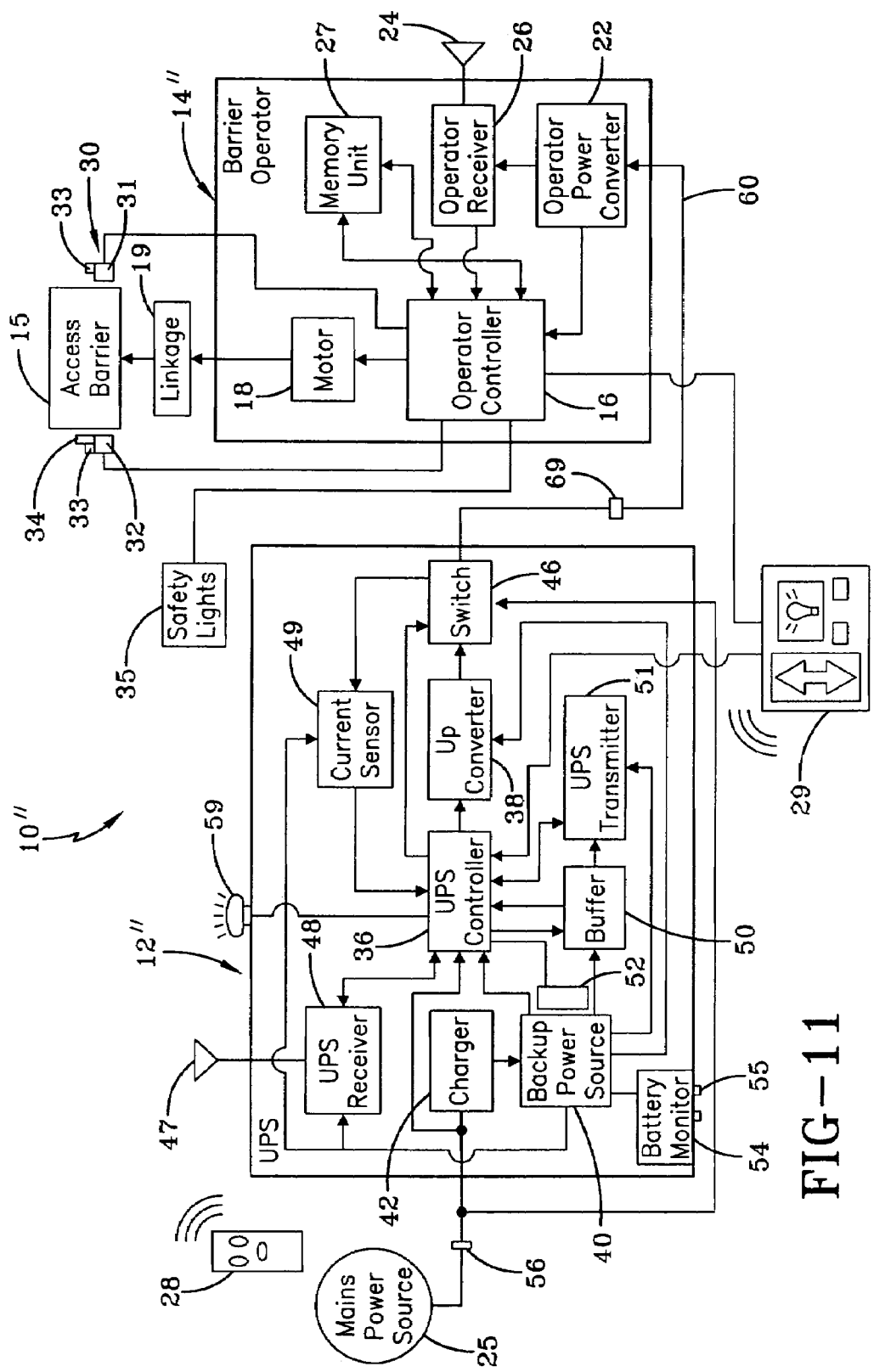
FIG. 11 is a schematic diagram of a further alternate embodiment of the UPS for a barrier operator.

A further embodiment shown in FIG. 11 and designated generally by the numeral 10" distinguishes itself over the embodiments disclosed in FIGS. 1-6, in that a UPS 12" is activated as a result of a mains power 25 failure, only by the receipt of a standardized preamble portion 142 as discussed with regard to FIG. 7. A barrier operator 14" functions and operates in an equivalent manner to that of the barrier operator 14' discussed with respect to FIG. 7. Additionally, the UPS 12" and barrier operator 14" can be removably attached using the connector 69 as discussed with regard to FIG. 1.

The UPS 12" includes the same components and operates in accordance with that of the embodiment previously discussed with respect to FIG. 7, with the present embodiment introducing the additional elements of a buffer 50 and a UPS transmitter 51. The buffer 50 is connected to the UPS controller 36, and the backup power source 40. The buffer 50 is a memory module that is capable of storing and retrieving the data portion 144 contained in the transmitted communication signal received by the UPS receiver 48. Specifically, the buffer 50 may be comprised of any type of RAM (random access memory), including but limited to flash memory, static RAM (SRAM), and dynamic RAM (DRAM). It should be appreciated that the storage capacity of the buffer 50 is sufficient to store the operation data word 144 contained in the communications signal 140 sent by any transmitter. Connected to the buffer 50 and to backup power source 40 is a UPS transmitter 51 which is able to wirelessly transmit the operation data word 144 stored in the buffer 50 to the operator receiver 26. It should be appreciated that the UPS transmitter 51 and operator receiver 26 are able to use any suitable communication frequency and/or protocol, as discussed with regard to the transmitter 28 and the operator receiver 26 of FIG. 1.

The function of the buffer 50 and UPS transmitter 51 will now be explained. When mains power 25 has failed, and the user desires to activate the UPS 12 to supply backup power to the barrier operator 14, he or she does so by sending a communication signal containing the desired barrier operator 14 function data 150 to the UPS receiver 47. Additionally, encryption data 148 and other information may also be sent with the function data 150. The UPS receiver 47 and UPS controller 36, which are configured to be responsive only to the preamble portion 142 of the communication signal 140, detects the preamble portion of the communication signal 140. As a result of the detection of the preamble 142, the UPS 12" is activated in a manner previously discussed with regard to the embodiment of FIG. 7. Although the communication signal 140 contains a data portion 144 in addition to the preamble 142, only the preamble 142 is identified and used to activate the UPS 12" and in turn waken the barrier operator 14". The remaining data portion 144 is not acted upon by the UPS 12", but is stored in the buffer 50 and then retransmitted by UPS transmitter 51 to the operator receiver 26. Once the data portion 144 is received by the operator receiver 26, the function identified by the data 150 is carried out by the operator 14 after authentication of the function data 150 using the encryption data 148. It should be appreciated that the buffer 50 may be integrated into the UPS controller 36, or be a separate component as shown in FIG. 11.

Figure 12A:
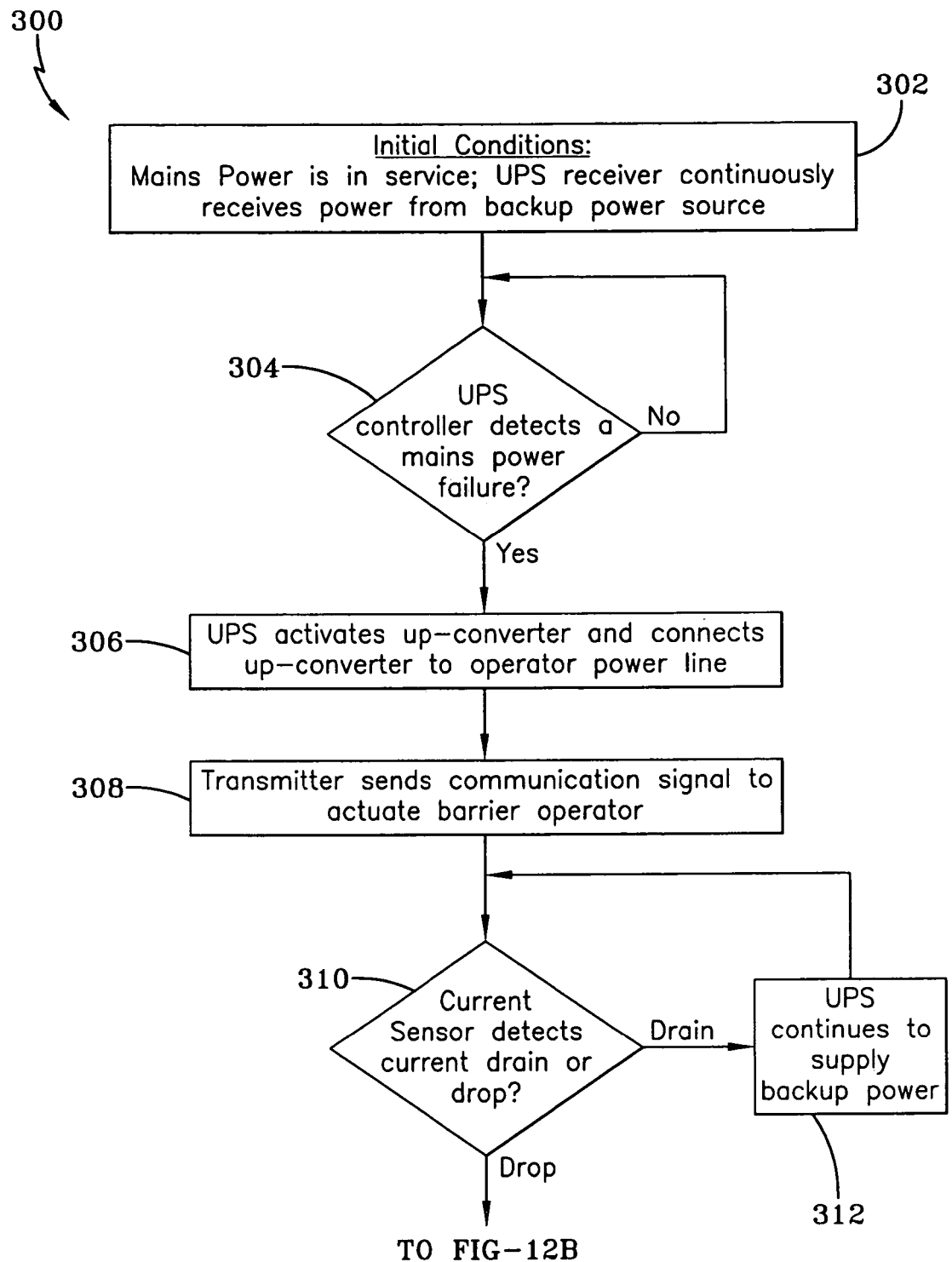

The flow chart shown in FIGS. 12A-B illustrate the operational steps, indicated by the numeral 300, which are taken by the embodiment shown in FIG. 11, when mains power 25 fails, and the backup power source 40 is utilized to allow the barrier operator to remain operational. At step 302, mains power 25 is in service and the charger 42 charges the backup power source 40. Next, at step 304, the UPS controller 36 monitors the mains power source 25 to detect the presence of a mains failure. If mains power 25 fails, then the process continues to step 306 where the UPS 12" immediately activates up-converter 38 and connects up-converter to operator power line 60. However, if the UPS controller 36 does not detect a mains power 25 failure, then the process repeats step 304. After the UPS 12" is activated at step 306, the user is required to send a signal via the remote transmitter 28 or wall station transmitter 29 to actuate the barrier operator 14" with a desired function, as indicated by step 308. Next, at step 310, the current sensor 49 of the UPS 12" determines whether the barrier operator 14 is drawing current from the UPS 12". If there is no current drop, then the process proceeds to step 312 where the UPS 12 continues to supply backup power to the barrier operator 14 and the process returns to step 310, where the current is continuously monitored. However, once the current sensor 49 detects that current has dropped below a certain threshold, for a predetermined period of time, then the process proceeds to step 314. At step 314, the UPS 12" deactivates the up-converter and the UPS receiver 48 is turned on. Next, at step 316, the UPS receiver 48 monitors for the presence of the preamble portion 142 of a user transmitted communication signal. The process remains at step 316 until a valid preamble portion 142 is detected by the UPS receiver 48. Once a preamble 142 is detected, then the process continues to step 318 where the up-converter 38 is activated and the UPS 12" provides backup power to the barrier operator 14", thereby activating the operator receiver 26. Somewhat simultaneously, the data portion 144 that follows the preamble 142 in the data word 140 of a transmitted communication signal is stored in the buffer 50, as indicated by step 320. Next, at step 322, the UPS transmitter 51 transmits the stored data portion 144 to the operator receiver 26. Continuing to step 324, the operator receiver 26 receives the transmitted data portion 144, the operator controller 16 authenticates the signal and/or encrypted data portion 148 if desired and carries out the user's selected function contained in the function data portion 150. As the access barrier 15 is being actuated by the barrier operator, the current sensor 49, continuously monitors for a change in current being drawn by the barrier operator 14. If the current sensor 49 detects that current is being drawn by the barrier operator 14, then the process moves to step 328, where the UPS 12 continues to supply backup power to the barrier operator 14. However, in the event that the current sensor 49 detects a drop in current below a certain threshold, for a predetermined duration, the process proceeds to step 330, where the up-converter 38 is deactivated, and the UPS receiver 48 continues to remain active via power supplied from the backup power source 40. Finally, the process returns to step 316, where the UPS receiver 48 continues to monitor for the presence of the preamble 142 transmitted in a communication signal.

The operational steps of the present embodiment of the system 10" as shown in FIG. 11 when mains power 25 returns to service are substantially the same as those steps shown and described with respect to FIG. 10.

It will be appreciated that one advantage of the systems disclosed herein is that it provides backup power to a barrier operator via an uninterruptible power source (UPS) on an as-needed basis, when a user actuates the barrier operator. Another advantage of the present invention is that the UPS is configured to work with existing, preinstalled, compatible barrier operators. Another advantage of the present invention is that the UPS of the present invention is easily installed by a user. Still a further advantage of the UPS of the present invention is that during a mains power failure, the UPS is able to power auxiliary lights to provide safe ingress and egress. This allows the user of the present invention uninterruptible power source to safely see during low-light conditions when mains power has failed. Yet another advantage of the present invention UPS, is to provide a battery monitoring system to allow a user to ascertain whether the backup power source, typically a battery needs to be replaced.

It is therefore to be understood that any variations evident fall within the scope of the claimed invention, and can be determined without departing from the spirit of the invention herein disclosed and described. Thus, the scope of the invention shall include all modifications and variations that may fall within the scope of the attached claims.

What is claimed is:

1. An uninterruptible power source (UPS) for supplying power to a barrier operator when mains power has failed, the barrier operator having an operator receiver to receive transmitted signals, the uninterruptible power source comprising:
    a UPS controller for detecting a mains power failure, said UPS controller responsive to a mains power failure and capable of generating a plurality of control signals;
    a backup power source connected to said UPS controller;
    an up-converter connected to said UPS controller and to said backup power source, said up-converter increasing the voltage of said backup power source and responsive to the signals sent by said UPS controller;
    a standby receiver power line connected to said UPS controller and connectable to the barrier operator, said standby receiver power line continuously supplying standby power from the backup power source to the operator receiver;
    a switch connected to said UPS controller, said up-converter, and the mains power source, said switch being responsive to one of said plurality of control signals of said UPS controller; and
    an operator power line connected to said switch and connectable to the barrier operator, wherein said switch, in response to a signal from said UPS controller, toggles the barrier operator between said up-converter and the mains power source.

2. The uninterruptible power source as recited in claim 1, wherein the backup power source comprises a battery.

3. The uninterruptible power source as recited in claim 2, wherein the battery is of a re-chargeable type selected from the group consisting of lead-acid, lithium-ion, nickel metal hydride, nickel cadmium, sodium/sulfur, nickel/sodium, manganese-titanium, rechargeable alkaline manganese, nickel zinc, iron-nickel, iron silver, redox (liquid electrode), lithium-sulfur and supercapacitors.

4. The uninterruptible power source as recited in claim 2, further comprising:
    a battery monitor connected to said battery, wherein said monitor indicates the status of the battery to a user.

5. The uninterruptible power source as recited in claim 4, further comprising a battery heater connected to said UPS controller and positioned proximal said battery.

6. The uninterruptible power source as recited in claim 1, wherein said UPS controller supplies continuous standby power to the barrier operator via a standby receiver power line.

7. The uninterruptible power source as recited in claim 1, further comprising:
    auxiliary lights connected to the barrier operator and controlled by one of said control signals.

8. An access barrier movement apparatus for moving an access barrier when mains power has failed, the apparatus comprising:
- a barrier operator having an operator receiver responsive to communication signals and an operator power converter for converting mains power to DC power;
- an uninterruptible power source connected to said barrier operator and comprising:
- a UPS controller responsive to failure of the mains power, said UPS controller sending and receiving a plurality of signals to control the operation of said access barrier operator;
- a backup power source connected to said UPS controller, said UPS controller providing said operator receiver with continuous operating power;
- a standby receiver power line coupled between said barrier operator and said UPS controller, said standby receiver power line continuously supplying standby power from said backup power source to said operator receiver;
- an up-converter connected to said UPS controller and said backup power source, said up-converter increasing the voltage of said backup power source in response to signals from said UPS controller; and
- a switch connected to said UPS controller, said switch controlled by said UPS controller, wherein said switch toggles said barrier operator between the mains power source and said up-converter in response to said UPS controller.

9. The access barrier movement apparatus as recited in claim 8, wherein said backup power source comprises a battery.

10. The access barrier movement apparatus as recited in claim 9, wherein said battery is of a re-chargeable type selected from the group consisting of lead-acid, lithium-ion, nickel metal hydride, nickel cadmium, sodium/sulfur, nickel/sodium, manganese-titanium, rechargeable alkaline manganese, nickel zinc, iron-nickel, iron silver, redox (liquid electrode), lithium-sulfur and supercapacitors.

11. The access barrier movement apparatus as recited in claim 9, further comprising:
- a battery monitor connected to said battery.

12. The access barrier movement apparatus as recited in claim 9, further comprising:
- a battery heater connected to said UPS controller.

13. The access barrier movement apparatus as recited in claim 8, further comprising:
- an at least one photo beam connected to the barrier operator.

14. The access barrier movement apparatus as recited in claim 13, wherein the at least one photo beam contains an auxiliary light.

15. An access barrier movement apparatus for moving an access barrier when mains power has failed, the apparatus comprising:
- a barrier operator having an operator receiver responsive to a data portion within a communication signal and an operator power converter for converting mains power to DC power;
- an uninterruptible power source connected to said barrier operator and comprising:
- a UPS controller responsive to failure of the mains power, said UPS controller sending and receiving a plurality of signals to control the operation of said access barrier operator;
- a UPS receiver connected to said UPS controller, said UPS receiver responsive to a preamble portion within said communication signal;
- a backup power source connected to said UPS controller and said UPS receiver;
- an up-converter connected to said UPS controller and said backup power source, said up-converter increasing the voltage of said backup power source in response to signals from said UPS controller;
- a switch connected to and controlled by said UPS controller, wherein said switch toggles said barrier operator between the mains power source and said up-converter in response to said UPS controller, and wherein said UPS receiver is switched on by said UPS controller after said back-up power source reaches a predetermined threshold;
- a buffer connected to said UPS controller and associated with said buffer; and
- a UPS transmitter connected to said UPS controller and associated with said buffer;
- said UPS receiver receiving said communication signal and enabling said up-converter based solely upon said preamble portion of said communication signal, and said UPS controller storing said communication signal in said buffer, wherein said up-converter provides power to said barrier operator and said operator receiver, said UPS transmitter subsequently transmitting said communication signal from said buffer to said operator receiver to enable receipt of power from said up-converter.

16. The access barrier movement apparatus as recited in claim 15, wherein said backup power source comprises a battery.

17. The apparatus as recited in claim 16, wherein said battery is of a rechargeable type selected from the group consisting of lead-acid, lithium-ion, nickel metal hydride, nickel cadmium, sodium/sulfur, nickel/sodium, manganese-titanium, rechargeable alkaline manganese, nickel zinc, iron-nickel, iron silver, redox (liquid electrode), lithium-sulfur and supercapacitors.

18. The apparatus as recited in claim 16, further comprising:
- a battery monitor connected to said battery.

19. The apparatus as recited in claim 16, further comprising:
- a battery heater connected to said UPS controller and positioned proximal to said battery.

20. The apparatus as recited in claim 15, further comprising:
- an at least one photo beam connected to the barrier operator.

21. The apparatus as recited in claim 20, wherein the at least one photo beam contains an auxiliary light.

22. The apparatus as recited in claim 15, further comprising:
- a current sensor connected between said UPS controller and said switch, said current sensor determining when said predetermined threshold is reached whereupon said UPS controller disables said up-convertor so as to remove power from said barrier operator.

23. The apparatus as recited in claim 22, wherein said UPS controller enables said up-converter for a predetermined time period when said UPS receiver receives said preamble portion, said up-converter providing power to said barrier operator and said operator receiver to allow later receipt of said communication signal with said data portion.

* * * * *